(12) United States Patent
Wang

(10) Patent No.: US 11,228,439 B2
(45) Date of Patent: Jan. 18, 2022

(54) SCALE OUT BLOCKCHAIN WITH ASYNCHRONIZED CONSENSUS ZONES

(71) Applicant: Jiaping Wang, Redmond, WA (US)

(72) Inventor: Jiaping Wang, Redmond, WA (US)

(73) Assignee: Jiaping Wang, Redmond, WA (US)

( * ) Notice: Subject to any disclaimer, the term of this patent is extended or adjusted under 35 U.S.C. 154(b) by 102 days.

(21) Appl. No.: 16/731,359

(22) Filed: Dec. 31, 2019

(65) Prior Publication Data

US 2020/0210451 A1 Jul. 2, 2020

Related U.S. Application Data

(60) Provisional application No. 62/787,660, filed on Jan. 2, 2019.

(51) Int. Cl.
| | | |
|---|---|---|
| *H04L 9/00* | (2006.01) | |
| *H04L 9/32* | (2006.01) | |
| *G06F 16/27* | (2019.01) | |
| *G06F 16/28* | (2019.01) | |
| *G06F 16/22* | (2019.01) | |
| *G06Q 20/06* | (2012.01) | |
| *G06Q 30/00* | (2012.01) | |
| *G06Q 20/38* | (2012.01) | |
| *G06F 16/901* | (2019.01) | |

(52) U.S. Cl.
CPC ........ *H04L 9/3236* (2013.01); *G06F 16/2246* (2019.01); *G06F 16/2255* (2019.01); *G06F 16/278* (2019.01); *G06F 16/28* (2019.01); *G06F 16/9027* (2019.01); *G06Q 20/0655* (2013.01); *G06Q 20/382* (2013.01); *G06Q 30/018* (2013.01); *G06F 16/9014* (2019.01); *G06F 2221/0795* (2013.01); *G06Q 2220/00* (2013.01); *H04L 2209/38* (2013.01)

(58) Field of Classification Search
CPC ............ G06F 16/2246; G06F 16/2255; G06F 16/278; G06F 16/28; G06F 16/9014; G06F 16/9027; G06F 2221/0795; G06Q 20/02; G06Q 20/0655; G06Q 20/382; G06Q 30/018; G06Q 2220/00; H04L 9/3236; H04L 2209/38
See application file for complete search history.

(56) References Cited

U.S. PATENT DOCUMENTS

| | | | | |
|---|---|---|---|---|
| 2017/0345011 A1* | 11/2017 | Salami | .................. | G06Q 20/10 |
| 2018/0302222 A1* | 10/2018 | Agrawal | ............... | G06F 21/604 |
| 2019/0220919 A1* | 7/2019 | Martinez | .............. | G07G 1/0036 |
| 2020/0118068 A1* | 4/2020 | Turetsky | ................ | G06Q 20/06 |
| 2020/0143471 A1* | 5/2020 | Jackson | ................ | H04L 9/3239 |

FOREIGN PATENT DOCUMENTS

| | | | | |
|---|---|---|---|---|
| WO | WO-2018161903 A1 * | 9/2018 | ........... | G06Q 20/102 |
| WO | WO-2019015474 A1 * | 1/2019 | ......... | G06Q 20/4014 |
| WO | WO-2020073246 A1 * | 4/2020 | ............. | G06Q 20/10 |

* cited by examiner

*Primary Examiner* — Diedra McQuitery

(74) *Attorney, Agent, or Firm* — Eversheds-Sutherland (US) LLP

(57) ABSTRACT

Systems and methods to implement a blockchain sharding architecture that running multiple homogeneous chain in parallel to subdivide the workload of the entire network without requiring a centralized coordinator.

20 Claims, 11 Drawing Sheets

US 11,228,439 B2

SCALE OUT BLOCKCHAIN WITH ASYNCHRONIZED CONSENSUS ZONES

CROSS REFERENCE TO RELATED APPLICATIONS

This application claims priority to U.S. Provisional Patent Application No. 62/787,660, filed Jan. 2, 2019, entitled "SCALE OUT BLOCKCHAIN WITH ASYNCHRONIZED CONSENSUS ZONES," the disclosure of which is incorporated by reference herein in its entirety.

BACKGROUND OF THE INVENTION

Blockchain-based technologies have provided a promising infrastructure for pseudonymous transfer of digital assets in a decentralized manner. However, there are various challenges surrounding the adoption of blockchain-based technologies, such as low transaction-per-second (TPS) which may hinder the scalability and usability of blockchain-based systems for increasing numbers of users and transactions. Another obstacle to achieving scalability is that every node may be required to duplicate the communication, storage, and state representation of the entire network.

TECHNICAL FIELD

One or more embodiments of the present invention are directed generally to and, more particularly, to a novel Nakamoto consensus system, which, in some embodiments, scales linearly without compromising decentralization or security. In at least one embodiment, these benefits (e.g., improved transaction confirming throughput of blockchain-based network) are achieved by running multiple independent and parallel instances of Nakamoto consensus (zones). The consensus may happen independently within each zone with minimized communication, which partitions the workload of the entire network and ensures moderate burden for each individual node as network grows. In some embodiments, techniques described here may utilize eventual atomicity to ensure transaction atomicity across zones, which may in turn provide assurances of the efficient completion of transactions without the overhead of two-phase commit protocol. In some embodiments, batch mining are used to ensure effective mining power in each zone at the same level of the entire network, making an attack on any individual zone as hard as that on the entire network. Various experimental results illustrate the effectiveness techniques described herein. For example, on a testbed including 1,200 virtual machines worldwide to support 48,000 nodes, techniques described herein can deliver 1,000×TPS over Bitcoin.

BRIEF DESCRIPTION OF THE SEVERAL VIEWS OF THE DRAWING(S)

DETAILED DESCRIPTION OF THE INVENTION

Figure 1:
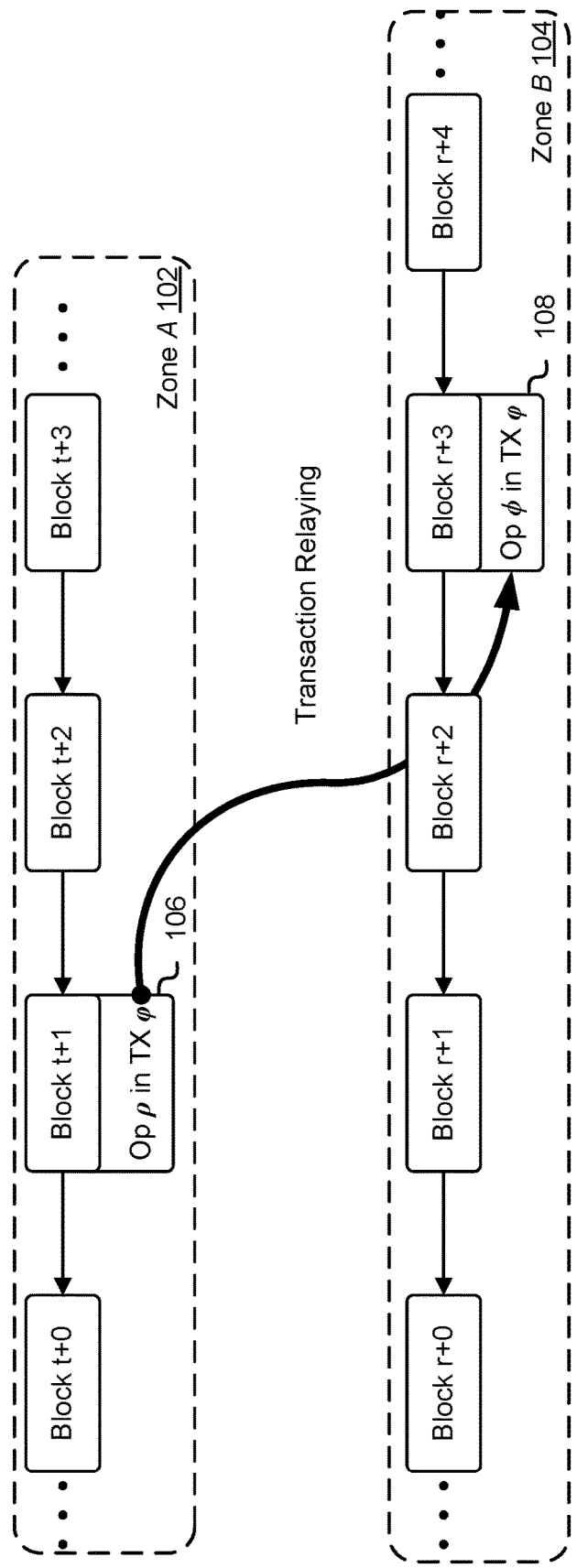
FIG. 1 illustrates, in accordance with at least one embodiment, message passing by relaying transaction across asynchronized zones.

As will be discussed in greater detail herein, a disclosed herein can be a Nakamoto consensus system, which scales linearly without compromising decentralization or security.

From the foregoing it will be appreciated that, although specific embodiments of the invention have been described herein for purposes of illustration, various modifications may be made without deviating from the spirit and scope of the invention.

1. Introduction

Since peer-to-peer electronic cash system was published the past several years ago, decentralized consensus systems (e.g., blockchain-based networks such as the Bitcoin network) have continuously enlarged its community and exerted bigger impacts on our society. However, low transaction confirming throughput, which is measured as transaction-per-second (TPS), has significantly hindered the usability of such systems for increasing number of users and transactions. In some cases, the root cause of the throughput issue is the sequential nature of block creation and network latency. In a blockchain network such as Bitcoin, blocks are created sequentially with sufficient propagation time in between, which yields a fixed, very low TPS, regardless how many full nodes and miners participate in the network. As specific illustrative examples, 7 TPS for Bitcoin with 1 MB block and 10-minutes interval; and 15 TPS for Ethereum with 32 KB block and 15-seconds interval.

Additionally, a consensus system may not be able to scale out efficiently when every full node needs to duplicate communication, storage, and state representation of the entire network, which is the case in various blockchain networks such as Bitcoin, Ethereum, and more. Even if a high TPS is achieved, workloads requiring fast communication and adequate storage may set a very high barrier for full nodes to participate in, which in turn may dramatically harnesses decentralization in practice. Therefore, a scalable Nakamoto consensus system may account for the scalability of its consensus protocol with the resource usage of communication, storage, and state representation, under the condition of decentralization and security.

In this disclosure, according to at least some embodiments, techniques described herein may be utilized to implement a scalable Nakamoto consensus system without sacrificing decentralization or security. In at least one embodiment, techniques described herein are utilized to scale out Nakamoto consensus by partitioning and handling workloads in multiple independent and parallel instances, zones. In at least one embodiment, consensus happens independently within each zone with minimized communication as well as divided and isolated storage and state representation. In at least one embodiment, different groups of miners work on each zone to secure a consensus. There may exist several challenges to design such a Nakamoto consensus system that can ensure the overall capacity as more zones are created and keep decentralization and security at the same time.

Scalability: Existing Nakamoto consensus systems require miners and full nodes to record all states of the whole network and all steps of their update history. Thus the actual capacity of the entire network is bound by every single full node.

Atomicity: The atomicity of transactions is crucial to the correctness and robustness of Nakamoto consensus system in various embodiments. Existing studies of blockchain with multiple zones either fail to ensure the atomicity for cross-zone transactions, or sacrifice the throughput due to the use of traditional two-phase "lock/unlock" mechanism to handle cross-zone transactions.

Security: The Nakamoto consensus system depends on the majority of mining power to outpace attackers, in at least one embodiment. However, when the mining power is distributed to different zones, an attacker can gather the mining power towards a single zone and may easily exceed the 51% mining power within that zone. This severe security issue is not addressed by existing proposals.

Embodiments described herein may address some or all of the system constraints described above. To address these issues, techniques described herein may be utilized to implement a scale-out Nakamoto consensus system. In at least one embodiment, a system achieves linear scale-out by partitioning workloads into zones. In at least one embodiment, the state of the entire network are partitioned by zones, and each zone is responsible for its own piece. In at least one embodiment, the core data structures, such as blocks and transactions, are zone-specific, and replicated and stored only within their own zones, in accordance with at least one embodiment. In at least one embodiment, mining competition, chain growth, and transaction confirmation are carried out separately and asynchronously in each zone.

In at least one embodiment, eventual atomicity is utilized to ensure transaction atomicity cross zones. Eventual atomicity may refer to systems in which all operations will complete with guarantee and will eventually achieve the correct end-state, although it may not occur immediately. Instead of completing all operations without interleaving with other transactions, as the traditional two-phase commit protocol does, eventual atomicity allows the interleaving of transactions to keep zones independent and fully utilized, according to at least one embodiment. In various embodiments, batch mining refer to techniques utilized to ensure the security of every single zone after partitioning. With batch mining, in at least one embodiment, the effective mining power in each zone will be at the same level of that in the entire network, which makes attacking an individual zone as hard as attacking the entire network.

In at least one embodiment, a scale-out Nakamoto consensus system is implemented by dividing workloads of communication, computation, and storage into independent and parallel zones. A scale-out Nakamoto consensus system in accordance with at least one embodiment keeps the burden of individual full nodes at a certainly low level as the network grows.

In at least one embodiment, eventual atomicity is implemented for efficient handling of cross-zone transactions and ensuring correctness and robustness in asynchronous zones.

In at least one embodiment, batch mining, a novel proof-of-work scheme, is utilized to prevent lowering the attack bar when the hash rate is dispersed into multiple zones.

In at least one embodiment, a set of experiments on a testbed including 1,200 virtual machines worldwide with the historical data of ERC20 payments from Ethereum is used to demonstrate that system described herein can deliver 1,000× TPS over Bitcoin.

2. Overview

This section provides details of the Nakamoto consensus system, compares two consensus mechanisms, e.g., Proof-of-Work (PoW) and Proof-of-Stake (PoS), at high-level and discuss the differences between two transaction models (e.g., UTXO and Account/Balance).

2.1 Nakamoto Consensus System

A Nakamoto consensus system, e.g., Bitcoin and Ethereum, has many compute nodes as miners and full nodes. Transactions are incremental updates of the state, which is confirmed and carried by blocks. Blocks are created by miners. The verification of a block is involved with a mathematical puzzle (also called as proof-of-work, PoW), which is moderately hard on the request side but easy to check for the network. Miners compete with each other, and the first miner who solves the puzzle will be given rewards and the one-time privilege for creating a new block. A newly-created block has to be sufficiently propagated among miners and full nodes before the next block can be created. Due to the network delay, other miners may still work on different blocks, and diverge the chain into different paths when appending blocks on the chain. The divergence of the chain is called as fork, and the blocks not in the main chain are called as orphaned blocks. Enlarging the block size (higher propagation latency) or lessening the creation interval may lead to more orphaned blocks, and even prevent the system from converging to a single longest chain in extreme circumstances (e.g. orphan rate>50%). Related studies are described in connection with Section 8.

Various aspects that affect the overall performance of a Nakamoto consensus system with the consensus protocol may include:

Consensus: The sequential nature of block creation and confirmation required by the consensus protocol is the major challenge of scalability. Bounded by the throughput as analyzed above.

Communication: Information, including unconfirmed transactions and newly-created blocks, needs to be exchanged between all miners and full nodes. Bounded by the local bandwidth.

Storage: All accepted blocks of the chain need to be stored persistently in every miners and full nodes. Bounded by the local disk space.

Representation: The global states of the entire network, e.g., per-address balance and smart contract state, are maintained by every miners and full nodes. Bounded by the size of host memory.

A scalable design of Nakamoto consensus has to take all four aspects into consideration.

2.2 PoW and PoS

As discussed above, PoW in various blockchain-based technologies such as Bitcoin and Ethereum requires miners to do a compute-intensive verification to maintain the consensus on each block. It requires huge electricity consumption but set a fundamental real world value to their cryptocurrencies.

In contrast, PoS selects the creator of a block through a deterministic way that usually depends on the stake (wealth) of a node. Existing PoS systems adopt different methods to produce the randomness in the leader election to ensure decentralization and security. Although PoW is described throughout this disclosure, techniques described herein may be orthogonal to the actual consensus mechanism used in each zone. PoW and PoS are discussed in greater details in Section 8.

2.3 UTXO and Account/Balance

Two types of transaction models that can be used in blockchain-based technologies include the Unspent Transaction Output (UTXO) model and account/balance model. The UTXO model may refer to a model in which a transaction spends outputs from previous transactions and generates new outputs that can be spent in future transactions. In a UTXO-based system, a user or an account may have multiple UTXOs. When a user wants to spend money, in at least one embodiment, she uses one or more UTXOs to cover the cost and may get some changes back as new UTXOs. The UTXO model is used by Bitcoin and many blockchain systems. The second type of transaction model is the account/balance model, which is similar to a bank account. Before approving a transaction, the bank needs to check if the account balance can cover the cost. This model is used by Ethereum, and thought by some to be better than UTXO for supporting smart contracts.

Compared to the UTXO model, the account/balance model is simpler in the sense that a transaction can only include one sending account and one receiving account instead of multiple UTXOs on both sides. In at least one embodiment, techniques described herein leverage the characteristics of account/balance model to enhance the throughput of cross-zone transactions.

3. Basic System Design

FIG. 1 illustrates a diagram 100 of a high-level architecture of a system for handling a transfer of digital assets that involves two users from different zones. Two zones, zone A 102 and zone B 104 are illustrated in FIG. 1. In at least one embodiment, withdraw operation p 106 that involves only the state in zone A is handled by a miner in zone A. If the account balance can satisfy the cost of this withdraw operation, the corresponding block t+1 carried the transaction will be generated by the miner and only be appended to the chain of zone A, according to at least one embodiment. After that, a relay transaction carrying the deposit operation φ is created at zone A and forwarded to zone B in at least one embodiment. In at least one embodiment, deposit operation φ 108 that only involves the state in zone B can always be executed, regardless the balance of the deposit account in zone B. In at least one embodiment, the relay transaction is picked up by another miner in zone B and then operation φ is executed, concluding the completion of the original transaction.

3.1 Partitioning and Naming

In at least one embodiment, an account, or a user, may be represented by its address, which may be represented as a fix-sized hash value of its public key. In at least one embodiment, the space of user addresses is uniformly partitioned into $2^k$ zones in a fixed and deterministic manner: a zone is identified by its partitioning order k and zone index s ($s \in \{0, 1, \ldots, 2^k-1\}$).

In at least one embodiment, given a partitioning order k, the zone index of a user can be derived by calculating the first k bits of its address. Various other partitioning rules may be utilized. The zone index of a transaction is determined, in at least one embodiment, by the payer's address and the zone index of a relay transaction is determined by the payee's address. In at least one embodiment, a block is specified with a tuple (s,k,h), where h being its height of the chain, k being the partitioning order, and s being the zone index.

In at least one embodiment, partitioning order k defines the number of zones and in turn determines the TPS and the capability of the entire network. In various embodiment, a fixed k is utilized for simplicity. In at least one embodiment, when greater capability is needed, stepped scaling out is allowed by gradually increasing k by one in each step without stopping the transaction handling in the network.

In some embodiments, full nodes join swarms to broadcast its transactions and receive and propagate blocks from miners. A swarm may refer to a group of one or more nodes that participate in replication of the same data set. As an example, in Bitcoin or Ethereum, there is only one swarm and every full node is replicating the same data set including all blocks and transactions. In at least one embodiment of the present disclosure, multiple swarms are established for different purposes. In at least one embodiment, distributed hash table (DHT) is employed for swarm addressing and discovery of peers in particular swarm, which may be described in connection with section 7.

In at least one embodiment, a global swarm is joined by full nodes (e.g., all full nodes) for replicating the minimum common information of all zones. On the other hand, most communication occurs in zone-specific swarms with full nodes belonging to specific zones, in accordance with at least one embodiment. In at least one embodiment, the participating full nodes in each swarm are sparsely connected and use a gossip protocol to broadcast messages. In at least one embodiment, zone-specific swarms are also identified by zone index s and partitioning order k, which may be in accordance with those described for zones.

3.1.1 Independent Consensus Overhead

A full node, or a miner, can have a persistent identifier that is initialized randomly and determines a particular zone the node should work on. With address space partitioning, Nakamoto consensus is established within each zone independently, in accordance with at least one embodiment. A miner, in some cases, only competes on PoW with other miners in the same zone and confirms transactions from its own zone. Full nodes can, accordingly, ignore any blocks or transactions received but are not belonging to their zone, although those are unlikely to be received.

Therefore, in at least one embodiment, the computation and storage related to transaction validation and chain formation are independent and isolated between zones: (1) a miner is only responsible for mining transactions happening within the zone in which it has chosen to participate, and (2) any node only records the chain for balances of users in its own zone. As the entire network grows, more zones will be created, ensuring the burden of computation and storage on an individual node always at a reasonable level. This low barrier of joining and operating in the network for a full node is essential to maintain decentralization and robustness of a Nakamoto consensus system.

3.1.2 Minimized Communication Overhead

In a Nakamoto consensus system, communications may be for replicating unconfirmed transactions and broadcasting blocks carrying confirmed ones. In at least one embodiment, communications for replicating unconfirmed transactions and/or broadcasting blocks carrying confirmed ones are performed only among nodes within a zone. In at least one embodiment, a distributed hash table (DHT) is used on each node wherein after getting the zone index s of an unconfirmed transaction or a forwarding block, a system selects out nodes having the same zone index as s based on the local DHT routing table, and sends the transaction and block to these nodes following the gossip protocol as that used in Bitcoin and Ethereum. This technique may be used to isolate most communications in each zone.

For cross-zone transactions, system sends relay transactions only to destination zones instead of the whole network, in at least one embodiment. Additionally, minimized data for chain forming excluding actual confirmed transactions is replicated across all zones, in at least one embodiment.

3.2 Cross-Zone Transaction Handling

Figure 2:
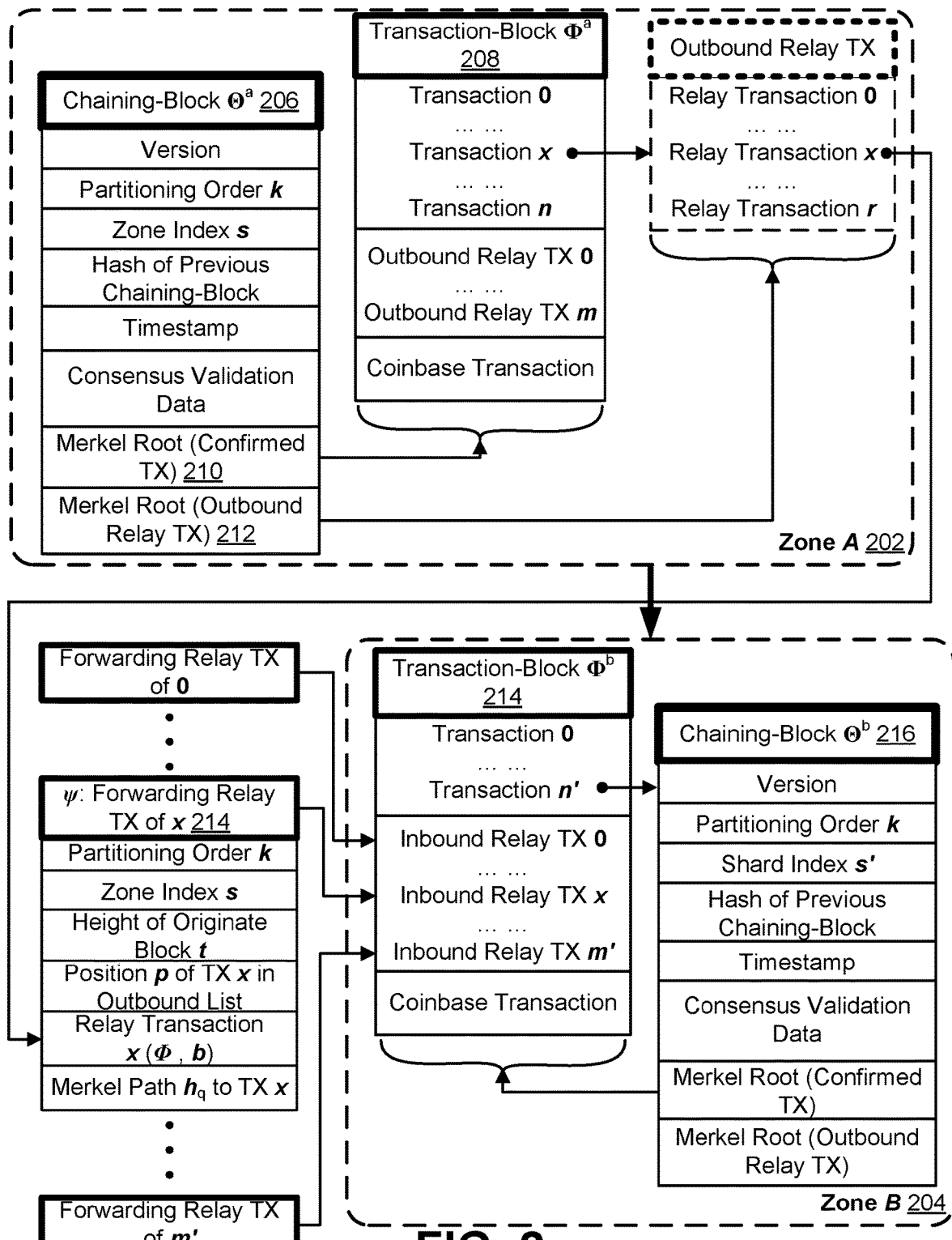
FIG. 2 illustrates, in accordance with at least one embodiment, data structure of the chaining-blocks and transaction-blocks.

FIG. 2 shows an illustrative example of a diagram 200 depicting cross-zone transaction handling, according to at least one embodiment. In at least one embodiment, FIG. 2 illustrates a Nakamoto consensus system with multiple zones, such as zone A 202 and zone B 204.

In some embodiments, a block of existing Nakamoto consensus systems is divided into two parts: a chaining-block for the chain formation and consensus verification; and a transaction-block carrying actual confirmed transactions. As shown in FIG. 2, a chaining-block $\Theta^a$ 206 carries information, including consensus validation data (e.g., for a PoW blockchain network, a nonce and/or PoW target), pointer to precursor block, Merkle tree root 210 of the list of confirmed transactions, etc. In addition, a chaining-block provides the Merkle tree root 212 for the list of all deposit (outbound relay) transactions originated from this block, which is used for the validation of relayed deposit transactions in other zones. FIG. 2 illustrates a transaction-block $\Phi^a$ 208 which records the transaction list (e.g., same as those in existing systems like Bitcoin and Ethereum) is replicated and stored in full nodes of the zone. Compared to the hundreds of kilobytes used for transactions, a chaining-block has a fix-sized data structure that takes tens of bytes, introducing negligible overhead for both communication and storage.

For a transaction with a withdraw operation $\rho$ from payer a and a deposit operation $\phi$ to payee b, it can be easily handled within zone if a and b belong to the same zone. When a and b are from different zones, a dual-stage transaction may be used as a handling mechanism to derive and forward a relay transaction that carries the deposit operation to its destination zone. FIG. 2 illustrates the process of cross-zone payment with the data structures processed, according to at least one embodiment.

Transaction Validation and Forwarding at Zone A

In at least one embodiment, an unconfirmed transaction $(\rho, a, \phi, b)$ is picked up by a miner in the payer a's zone (e.g., zone A 202), when the miner constructs a new block. The payer may also be referred to as a sender.

The transaction is validated based on whether the balance of a is no less than the transfer amount. If the balance is insufficient, the transaction will be marked as invalid, concluded and embedded in the block.

Otherwise, a chaining-block $\Theta^a$ 206 and a transaction block $\Phi^a$ 208 are constructed. In at least one embodiment, $\Phi^a$ has a list of validated transactions including the one from payer a to payee b. A payee may also be referred to as a recipient.

The miner works on a PoW puzzle specific to the list of all confirmed transactions.

After the PoW puzzle is solved, immediately the chaining-block $\Theta^a$ 206 is broadcast in the global swarm and the transaction block $\Phi^a$ 208 is broadcast in a's zone-specific swarm. In at least one embodiment, solution to a PoW puzzle is an example of consensus validation data and other types of consensus validation may be calculated or derived in any suitable manner.

In-zone transactions are executed and concluded.

The withdraw operations p in all cross-zone transactions are then executed.

Each cross-zone transaction derives an outbound relay transaction $\psi:=(\phi, b, y)$, which will be sent to and broadcast in the destination zone, (e.g., the payee b's zone B in FIG. 2).

Relay Transaction Handling at Zone B

In at least one embodiment, an inbound relay transaction $\psi$214 is picked up by a miner in payee b's zone (e.g., zone B 204) when constructing a new block.

The miner verifies the inbound relay transaction against its original block $\Theta^a$. Skip it if invalid.

The miner constructed a new chaining-block $\Theta^b$ 216 and a transaction-block $\Theta^b$ 218. $\Theta^b$ includes the inbound relay transaction $(\phi, b, y)$.

The block $\phi^b$ will be broadcast in I's zone after the consensus validation data is derived (e.g., PoW puzzle is solved).

The deposit operation $\phi$ is executed, concluding the transaction $(\rho, a, \phi, b)$.

In accordance with FIG. 2, and in at least one embodiment, the transaction-blocks are propagated and stored in its own zone (e.g., $\Phi^a$ and $\Phi^b$ in zone A and zone B, respectively). The relay transactions, e.g., $\psi$, are generated at the original zone, (e.g., zone A in FIG. 2), and only sent to the destination zone, (e.g., zone B in FIG. 2). The chaining-blocks, e.g., $\Theta^a$ and $\Theta^b$, each of which has tens of bytes, are replicated to all zones.

3.2.1 Transaction Verification

When a miner in zone B receives a relay transaction from zone A, it may need to verify this transaction in order to avoid the attack from a malicious relaying node. As shown in FIG. 2, a forwarded transaction $\psi=(\phi, b, \gamma)$, includes verification data $\gamma$, where $$\gamma:=(S,k,t,p,\{h_q\}),\quad\text{(Equation 1)}$$

position pointer p denotes the position in the list of outbound relay transactions in its original block, hash values $\{h_q\}$ refer to hash values on all sibling nodes on the path from Merkle tree root to its own entry; and zone index s, partitioning order k, and height t are used to identify its original block.

For the verification, the Merkle tree root is recalculated using hash values along the Merkle tree path and the transaction $(\phi, b)$ itself. It is verified if recalculated Merkle tree root matches with that in its original block $\Theta^a$. Note that, in some embodiments, the relationships to siblings (left or right) is not encoded in $\{h_q\}$, which can be inferred from bits in p.

3.2.2 Block Verification

When receiving a block broadcast by a miner, a full node may need to verify the block to avoid the attack from malicious miners. In some embodiments, a full node may need to verify three types of transactions when receiving a new block (actually, the pair of chaining-block and transaction-block). As shown in FIG. 2, they are, in accordance with at least one embodiment:

Confirmed withdraw transactions in its own zone;
Inbound relay transactions previously forwarded from other zones;
Outbound relay transactions forwarded to other zones.

In at least one embodiment, to save the storage space of full nodes, transactions of first two types are embedded in a newly-created transaction-block while outbound relay transactions are not, since they can be derived from the list of confirmed withdraw transactions.

When a full node verifies a newly-created block, in at least one embodiment, it verifies transactions of all three types. Confirmed transactions may be verified against current user states. The inbound relay transactions may be verified against its original block, such as by using techniques described in section 3.2.1. In at least some embodiments, this process also checks if related outbound relay transactions are created as expected, by double checking the Merkle tree root of the list of all outbound relay transactions. In at least some cases, it is assumed that outbound relay transactions are ordered and precisely consistent with the order of confirmed withdraw transactions. In at least some embodiments, only the Merkle tree root of the list recorded is embedded in the chaining-block, instead of the outbound relay transactions themselves.

3.3 Generalization Beyond Payment

In various embodiments, there are challenge involved in correctly handling generalized relay transactions, and guaranteeing the atomicity. In at least some embodiments, the withdraw-deposit paradigm described hereinabove is generalized to a more general model with programmable transaction logic.

In at least one embodiment, Oxidation refers to a programming model based on functional programming which allows easily describing transaction logic (e.g., smart contract) that can be relayed across zones for executing different pieces of transaction logic with consensus. Oxidation, may be based on functional programming, which allows easily describing transaction logic (e.g., smart contract) that can be partitioned across zones for executing different pieces of transaction logic with consensus.

In at least one embodiment, an Oxidation program defines state and structure in an object-oriented style and defines execution logic in a procedural style like most modern programming language. In at least one embodiment, there are four key features that make oxidation programming unique:

1. Each piece of state is keyed, which makes it associated with specific consensus zone. A consistent, unique key can be inferred from any instance of state, or structure, e.g. a binary data of certain amount of bits. The data can be related to certain user (e.g. balance) and can also be not related to any user (e.g. a domain name).
2. An instance of state, or structure might be owned by one, or more parties, each is presented by their identities (e.g. public key).
3. Methods, or functions, are associated with structures as most object-oriented language. While, invocation of a method may require secure verification information (e.g. digital signature), which is called Privileged Method. The secure verification information may be verified against the identity key(s) of one, or more relevant parties.
4. A transaction can include multiple invocation of methods or functions and may involve multiple instances of different states, or structures. In one execution scope in a consensus zone, only instances of states, or structures within the same consensus zone are available, according to at least one embodiment. Manipulation of cross-zone instances of states, or structures may be dependent on a relayed invocation operation which carries context, arguments and execution logic (e.g. a message passing API).

4 Eventual Atomicity

Consider transactions involving two types of operations—for example, a payment transaction involving a withdraw and deposit operation. For these types of transactions, there is a need for operations to be atomic to ensure correctness of the global ledger. Atomicity may refer to two or more operations being executed in an all-or-nothing manner—for example, in a payment transaction, if a withdraw succeeds but a correspond deposit fails, then the withdraw is rolled back. In existing blockchain systems (e.g., RSCoin and OmniLedger) the variants of two-phase commit (2PC) mechanism are used to ensure the atomicity, with the known lock/unlock overhead.

In at least one embodiment, for a cross-zone transaction, the withdraw operation is allowed to happen first, even interleaved with other transactions; and the corresponding deposit is to be settled later. What is guaranteed is that once the withdraw operation is confirmed, the deposit will always be executed eventually. This type of atomicity may be referred to as eventual atomicity.

In some embodiments, newly-derived outbound relay transactions (e.g., for deposit) are, by default, forwarded to their destination zones by the miner, who created the chaining-block and the transaction-block in the original zone. Once the relay transaction get replicated in the destination zone, it will never expire before being picked up by a miner, unless its withdraw operation is reverted, e.g., orphaned block due to the chain fork, in at least one embodiment. If a relay transaction is accidentally dropped, it can be reconstructed by any full node in the original zone based on its original block on the chain, in at least one embodiment. In various embodiments, no additional verification or consensus is required to restart the replication of the reconstructed relay transaction.

In the original Nakamoto consensus system, a payment transaction will be visible to its payee once it is packed in a block on chain (first confirm), and will be secured after n−1 successive blocks appended (n-th confirm, n=6 in Bitcoin and 12 in Ethereum). In contrast, a cross-zone payment transaction, in at least one embodiment, will be visible to payee once its relay transaction is forwarded to payee's zone, and its original block (e.g., the chaining-block at the original zone) becomes available. In at least one embodiment, with the eventual atomicity, a transaction is considered as eventually secured, once its original transaction (e.g., the withdraw) gets n-confirmed, and the relay transaction (e.g., the deposit) gets first confirm. Additional latency for the transaction confirmation may occur, when the relay transaction waits too long to be picked up by a miner. This could be even longer than n-confirming time of its original transaction theoretically, since miners of these two zones are working independently. However, in at least some cases, no additional delay is introduced in practice, as shown in our experiments of Section 7.4.

4.1 Fork Resolution

There can be, in some cases, a potential issue on the atomicity of a cross-zone transaction: when a fork occurs at the original zone and reverts the confirmed transactions (withdraw operations), their relay transaction (deposit operations) at the destination zones need to be invalidated as well to maintain the correctness.

In at least one embodiment, the GHOST protocol is followed by nodes in each zone to resolve temporary forked chains by accepting the chain having largest subtrees as the main chain. In at least one embodiment, the balances of all users $\psi$ in a zone is constructed by summing all withdraw and deposit operations in blocks $\Theta_i$ of the accepted chain with length h:

$$\psi^h := \psi^o \oplus \Sigma_{i=1}^{h} \Theta_i, \qquad \text{(Equation 2)}$$

where $\psi^o$ denotes the initial balances of all users.

In at least one embodiment, when a different main chain is discovered, the account balances will be reconstructed from the latest common block of the new and the old main chains. In at least one embodiment, all blocks in an old chain will be orphaned after a different main chain is discovered and. As part of accepting a new main chain, previously confirmed transactions including withdraw transactions and inbound relay transactions may be reverted. In at least one embodiment, reversions are performed independently in all full nodes that accepted a new main chain. In at least one embodiment, those reverted transactions are replicated in the zone again and wait to be picked, as if they have not been picked up before.

When a block including a relay transaction is reverted in an original zone, a destination zone may exist in one or more of the following states: in a first state, the destination zone has not generated a block including the relay transaction and a miner in the destination zone will eventually pick up this inbound relay transaction, upon which it will invalidate and skip it during verification because the chaining-block has been reverted in the original zone and is no longer available; in a second state, the destination zone has already appended a block including the relay transaction on chain—for this case, an orphan relay transaction may be processed. An orphan relay transaction may be described in greater detail, such as below.

In some embodiments, particular relay transactions with their original block orphaned are invalidated, but those blocks that carry orphan relay transactions remain valid. Chaining-blocks may be replicated to all zones (e.g., as discussed in connection with Section 3.2), meaning that a full node can monitor the change of the network and know if a transaction in its own block depends on other blocks at different zones. In at least one embodiment, when a node detects an orphaned block that a relay transaction in its own block depends on, the node reverts the balance previously updated by this transaction by playing back the chain (e.g., at the destination zone) from the block that confirmed the orphan relay transaction, similar to the balance reconstruction happened in the original zone.

In at least one embodiment, it may be possible that an orphan relay transaction may invalidate confirmed transaction (withdraw) in subsequent blocks—in this case, the previous block of the first invalidated block becomes the new head of the chain (or even no longer the main chain), potentially yielding further cross-zone invalidation of transactions. It should be noted that this knock-on effect is guaranteed to end because it only affects subsequent blocks. However, frequently invalidating blocks may reduce overall system throughput. To statistically avoid an orphan relay transaction to invalidate subsequent confirmed transactions, a λ-secured balance V) is used for validating new transactions: In at least one embodiment, when creating a t-th block, the λ-secured balances $\tilde{\psi}_{t-1}$ are defined as:

$$\tilde{\psi}_{t-1} := \psi^o \ominus \Sigma_{i=1}^{t-1} \gamma_i, \quad \text{(Equation 3)}$$

where $Y_i$ denotes all transactions in block i except in-bound relay transactions without its original transaction λ-confirmed.

In at least one embodiment, when a withdraw transaction is confirmed by sufficiently many blocks (≥λ), the payment is secured and the fund can be used in further payments; while the amount of the fund is seized and cannot be transferred away, before the relay transaction for deposit is confirmed. A greater λ may introduce a longer seized period but is better to ensure no invalidation of subsequent confirmed transactions, when a fork occurs and the main chain switches.

5 Mining Pool

In some cases, miners are individuals and mining power is fragmented such that randomness of voluntary zone assignment based on the local identifier is safe, wherein no individual miner controls more than 50% mining power in any zone. However, it may be the case that professional mining facilities are able to gradually dominate the mining power by owning great amount of mining power or aggregating mining power from individual miners, which delivers steady, frequent and divided mining rewards. In at least one embodiment, a rational mining facility ideally distributes its total mining power in different zones to maximize the rewards (bias to zones with lower mining difficulty). However, there may be considerations made to address the case where a malicious mining facility gathers all its mining power towards a single zone in an attempt to own more than 50% of mining power within a zone. This lead to a much lower attack bar $$\frac{50}{2^k}\%$$

for a particular zone relative to the total mining power in the network.

In at least one embodiment, to prevent zone-specific attacks, batch mining techniques may be utilized. In at least one embodiment, batch mining refers to techniques that allow and encourage a miner to create multiple blocks in different zones with one solved PoW puzzle. In at least one embodiment, allowing miners to create blocks in different zones with a single solved PoW puzzle ensures the effective mining power in each zone nearly equals to the total physical mining power in the entire network, raising the attack bar in each zone close to 50% when most of miners participate in batch mining. In at least one embodiment, batch mining improves the power efficiency of a blockchain network, thereby improving the operation of one or more computer systems (e.g., a blockchain network comprising a plurality of nodes). In at least one embodiment, batch mining techniques described herein reduce energy consumed in solving PoW by making it more productive with block creation.

5.1 Batch Mining

Figure 3:
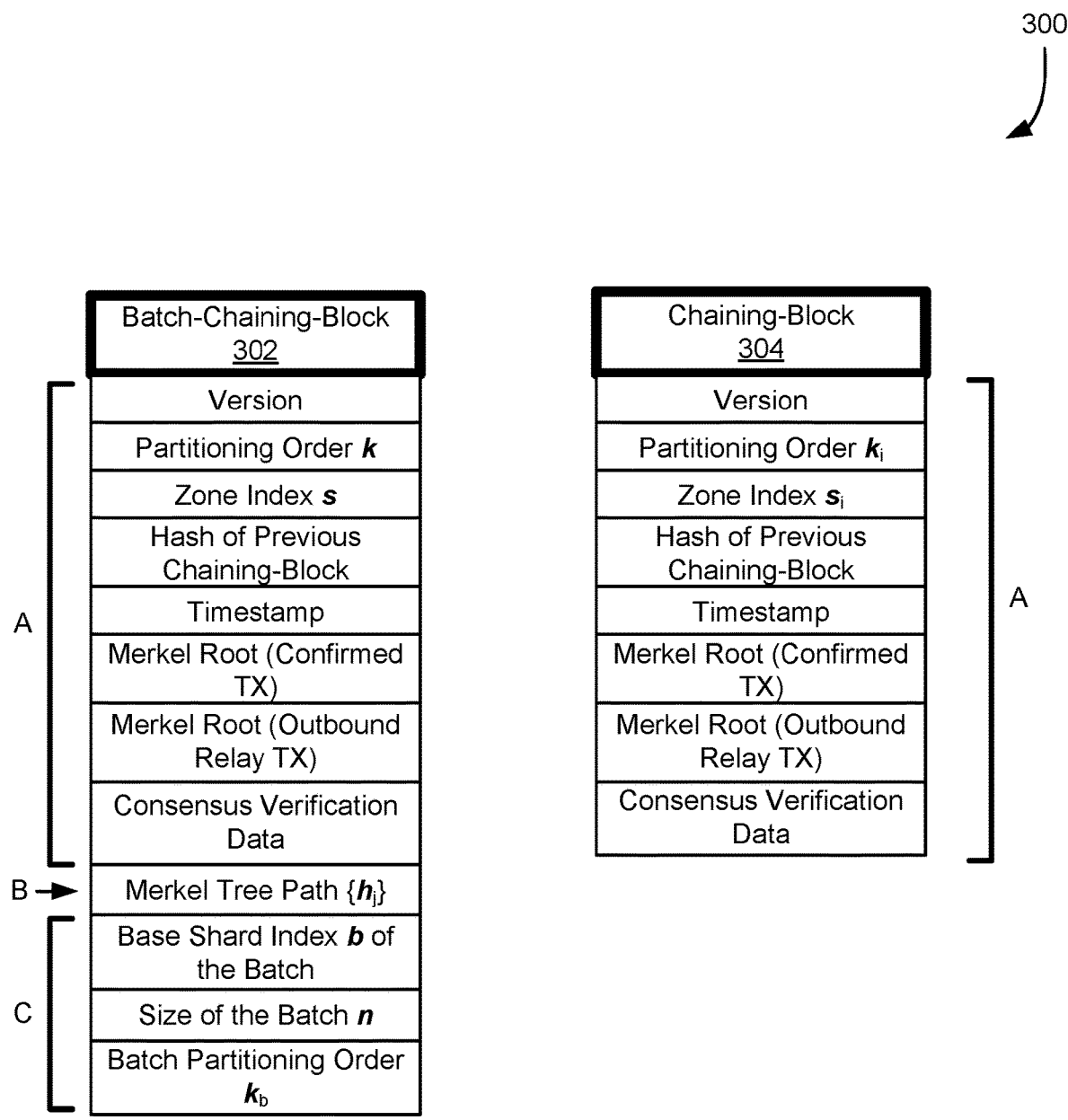
FIG. 3 illustrates, in accordance with at least one embodiment, comparison of a batch-chaining-block and a chaining-block.

FIG. 3 illustrates a diagram 300 of a batch-chaining-block 302 and chaining-block 304, according to at least one embodiment. Batching mining may be implemented in the context of various types of blockchain networks, such as PoW and PoS blockchain networks, as two non-limiting examples. For example, in a PoW blockchain network, consensus verification data may refer to a PoW target. In at least one embodiment, a batch-chaining-block 302 for a PoW chain includes a batch PoW nonce $n_b$. A PoW target may be an example of a block creation requirement and a PoW nonce may be an example of an attestation that the block creation requirement was satisfied. In at least one embodiment, chainging-block 304 for a PoW chain includes a nonce $\eta_i$. In at least one embodiment, batch mining allows a miner to use a single PoW to create multiple blocks at different zones simultaneously, but more than one block per-zone. In at least one embodiment, FIG. 3 illustrates a batch-chaining-block. In at least one embodiment, a batch-chaining-block replaces a chaining-block, as shown in FIG. 2, and is replicated among all zones. In at least one embodiment, miners are allowed to preform batch mining for n zones starting from zone index b or all zones ($n=2^k$, $b=0$) based on their capacities of computing resources.

In at least one embodiment, a miner performs transaction validation for n zones and collect n chaining-headers $A_i$, (e.g., part A). If batch mining is not used, such as in Bitcoin or Ethereum, a miner may be required to find n nonce $\eta_i$ ($i \in [0,n-1]$) that each fulfills $$\text{hash}(\langle A_i, \eta_i \rangle) < \tau, \quad \text{(Equation 4)}$$

in which $\tau$ denotes the PoW target (e.g., a large integer) determining the mining difficulty, and the <operator takes place by regarding the hash value as a big integer. In at least one embodiment, with batch mining, a miner only needs to find a single nonce $\eta_b$ that fulfills $$\text{hash}(\langle h_0, C, \eta_b \rangle) < \tau, \quad \text{(Equation 5)}$$

in which C is the configuration of the batch (e.g., part C in FIG. 3) and $h_0$ denotes the root of Merkle tree $Y_b$ over the list of all chaining-headers in this batch:

$$\langle A_0, A_1, \ldots, A_{n-1} \rangle. \quad \text{(Equation 6)}$$

In some embodiments, the PoW targets is or is assumed to be the same in all involved zones.

In at least one embodiment, once $\eta_b$ is found, zone-specific batch-chaining-blocks are composed and sent to corresponding zones. As illustrated in FIG. 3, for each zone, a batch-chaining-block may carries a chaining-header (e.g., part A of FIG. 3), its Merkle tree path $\{h_j\}$ (e.g., part B of FIG. 3), batch configuration (e.g., part C of FIG. 3), and the found batch PoW nonce $\eta_b$, which are the minimum information for recalculating equation 5 and verifying the PoW. In at least one embodiment, the relationships to siblings (left or right) in the Merkle tree path $\{h_j\}$ is not explicitly recorded—rather, the relationships are inferred from bits of the offset in the batch list (s-b). By this means, the zone index s is coupled with the offset in the block list (Equation 6) in the batch, which guarantees that a miner is able to create only one block for each involved zone in one batch.

In at least one embodiment, full nodes as well as miners in each zone treat batch-chaining-blocks and chaining-blocks equally when accepting a new block and follow the same approach to detect and resolve forks as described in Section 4.1. In at least one embodiment, a chain of a zone is allowed to include batch-chaining-blocks and chaining-blocks at different block heights.

5.2 Independent Validation in Zones

In at least one embodiment, batch mining solves the PoW for chaining-headers in batch, while the batch-chaining-block with solved nonce are zone-specific and sent separately. In at least one embodiment, per-zone batch-chaining-blocks are validated and accepted independently in each zone. In at least one embodiment, a block can be orphaned or even invalidated, but will not affect the validation or acceptance of others.

In at least one embodiment, independent validation allows for efficient handling of mixed PoW targets of zones in one batch. In at least one embodiment, the construction of batch-chaining-blocks is the same as that described in section 5.1 but allows different values of PoW targets in each chaining-header. In at least some embodiments, in probing the batch PoW nonce $\eta_b$, it is possible that some blocks with high PoW targets (easier to fulfill) are fulfilled but others are not. Batch-chaining-blocks for these fulfilled zones may be composed and sent to their zones immediately, regardless PoW targets of other zones are not fulfilled (thus not be sent out). In at least one embodiment, fulfilled blocks in the list of chaining-headers (e.g., Equation 6) are removed and replaced with their successive candidate blocks. In at least one embodiment, probing of a batch PoW nonce switches to a new puzzle with updated $h_0$ in Equation 5. In at least some embodiments, the event of finding a fulfilled nonce in different zones is independent and random, and as such, switching does not reduce mining efficiency.

5.3 Redistributed Mining Power

As described in greater detail below, batch mining techniques can be utilized to make an attack on a single zone as hard as the attack on the entire network, which can set the attack bar at the same security level of blockchain networks such as Bitcoin and Ethereum, in accordance with at least some embodiments.

Hash rate may be used to describe the mining power, which is proportional to the speed of producing new blocks. In a network having $2^k$ zones, let $m_p$ be the total physical hash rate of miners that participate in batch mining and $m_d$ be the total physical hash rate of miners that don't (as individual miners). The effective hash rate ms distributed in each zone can be calculated as $$m_s = \frac{m_d}{2^k} + m_p. \quad \text{(Equation 7)}$$

If a malicious node can obtain $$> \frac{m_s}{2}$$

hash rate in any zone, it can control this zone, according to at least some embodiments. Therefore, the attack bar in each zone, which can be calculated as the obtained hash rate of a malicious node divided by the total hash rate in the network, is $$> \frac{m_s}{2(m_d + m_p)} = 50\% - \frac{md(2^k - 1)/2^k}{2(m_p + m_d)}, \quad \text{(Equation 8)}$$

which converges to 50% when mining facility dominates the total hash rate. For example, if mining facility contributes 99% hash rate in a 256-zones network, a successful attack requires 49.5% of total physical hash rate in the network. As of September 2018, in Bitcoin network, 100% hash rate is contributed by mining facilities.

To maximize the incentive from a single PoW solution, professional mining facilities can participate in all zones and attempt to take rewards from all zones. Batch mining amplifies miner's mining power, which is multiplied with the number of zones a miner participates in. In at least some embodiments, the amplified mining power is evenly distributed to all involved zones. Such an effective amplification of mining power helps honest miners that distribute mining power to all zones but don't apply to attackers targeting on a single specific zone.

5.4 Scalable Mining System

Figure 4:
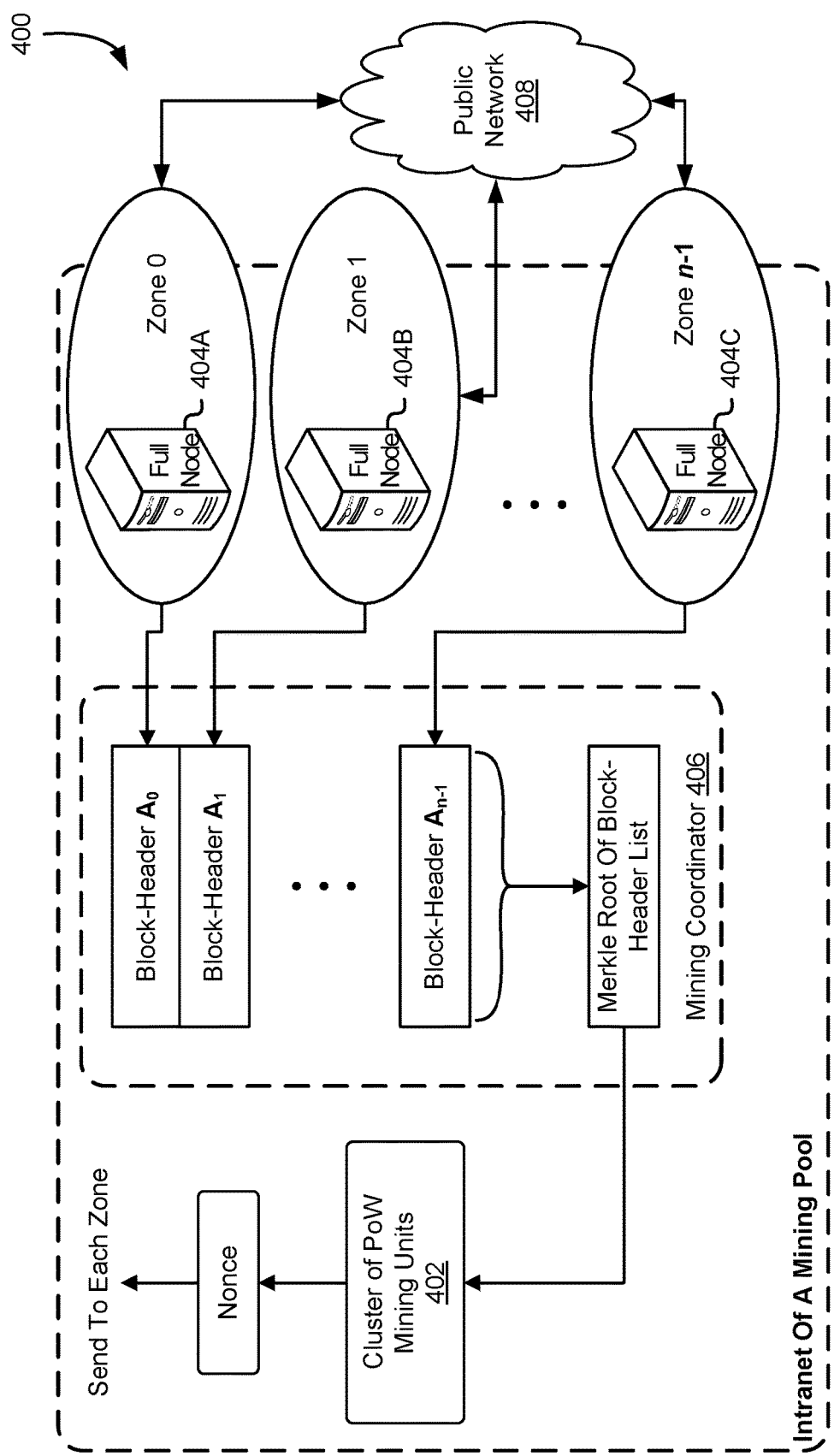
FIG. 4 illustrates, in accordance with at least one embodiment, internal architecture of a mining system.

FIG. 4 illustrates a computing environment 400 of an internal architecture of a mining system, according to at least one embodiment. A mining system of Bitcoin or Ethereum in a mining facility may refer to a distributed system comprising hundreds or even thousands of PoW mining units, e.g., GPU and Specialized Application-Specific Integrated Circuit (ASIC) focused on hash probing and/or computer systems working on actual transaction validation and block construction.

In some embodiments, a mining system is desired to monitor multiple zones. The partitioning scheme in the network naturally provides a scalable solution for a mining facility observing a large number of zones. As illustrated in FIG. 4, besides the cluster of PoW mining units 402, in addition, there is a cluster of full nodes 404A, 404B, and 404C for observing all involved zones, independently discovering new blocks, validating transaction, and constructing candidate block-headers $A_i$. Once $A_i$ is updated in any zone i, new $A_i$ is sent to mining coordinator 406 in FIG. 4. In at least one embodiment, Merkle tree of block-header list (Equation 6) is recalculated by the mining coordinator 406 and the updated Merkle tree root $h_0$ (Equation 5) is broadcast to a cluster of PoW mining units 402. Such design provides a non-limiting illustrative example and demonstrates how a scalable mining system can be implemented and operated for a professional mining facility. Public network 408 may be any suitable network such as a public Internet.

6 Discussions 6.1 Single Address Hotspot

It is possible that a single address is involved in a great number of transactions, e.g., a deposit address of a large cryptocurrency exchange. In the workload described in Section 7, the address 0x3f5CE5FBFe3E9af3-971dD833D26bA9b5C936f0bE, which is one deposit address of Binance (a cryptocurrency exchange), is the payee of more than 2% total transactions. If a single address is the finest unit in a partitioning scheme, a system operating according to such a partitioning scheme cannot further partition such workload into multiple zones.

In at least some embodiment, such a "single address hotspot" issue can be resolved with a co-design of applications at upper layer. For example, an application or a user can allocate multiple deposit addresses in different zones for load balancing. In at least one embodiment, an institutional operator announces a list of addresses for deposit, and the wallet application automatically chooses a random address, or even a intra-zone address if available, for transferring digital assets. As a result, the transaction throughput of multiple zones can be leveraged.

6.2 Incentives and Fees

In at least one embodiment, techniques based on Bitcoin's incentive model are utilized to reward miners with phase down coinbase and user defined transaction fee in every zone. Regarding transaction relaying and multiple zones, in at least one embodiment, additional rules of incentive and fee allocation apply.

In at least one embodiment, a relaying transaction introduces fee splitting between two miners in different zones so that the relay transaction in the destination zone has the same priority as other transactions in the zone. In at least one embodiment, the transaction fee is equally split. Fee splitting may be used to encourage intra-zone transactions, since the miner will take fees from them.

In at least one embodiment, batch mining is encouraged by rewarding blocks generated using batch or non-batch mining equally. In at least one embodiment, for a given fixed mining power, the profit of batch mining is proportional to the number of zones in the miner's batch. It is rational for professionally-operated miners to work on all zones simultaneously, which enhances the overall security of the network.

7 Experimental Results

In some embodiments, a system is implemented in C++ or at least in part in C++. Cryptography may implemented using Botan cryptography library (v1.11) and Intel IPP Cryptography library (v7.1). In at least some embodiments, RocksDB (v4.11) is used to store archived blocks and transactions. In at least one embodiment Mainline DHT for P2P is implemented for routing and swarm formation for the global swarm and per-zone swarms. Mainline DHT is compatible with BitTorrent nodes, which are widely deployed throughout the Internet. In at least one embodiment, BitTorrent network is leveraged for fast routing and discovery of nodes in our system.

The proposed system may be evaluated by playing back the complete historical ERC20 payments in Ethereum from the beginning up to the block height 5867279, which includes 16.5 million unique addresses and 75.8 million transactions. In at least one embodiment, a system is deployed on a distributed environment that includes 1,200 virtual machines, each of which has 8 cores and 32 GB memory. These machines are uniformly distributed in 15 Availability Zones for testing cross-country latency in the real world. In the test network, the end-to-end peek bandwidth is restricted to 30 Mbps and the measured average end-to-end latency is 102.48 msec. In every zone, a 32 KB limit is set for the block size and a target of 15-second block creation interval, which yields around 15.6 TPS for one-to-one token transfer. The average orphan rate in every zone is 8.3%, which is independent of the number of zones. On such a testbed, 48,000 nodes of blockchain are supported in the system.

Scalability

Figure 5:
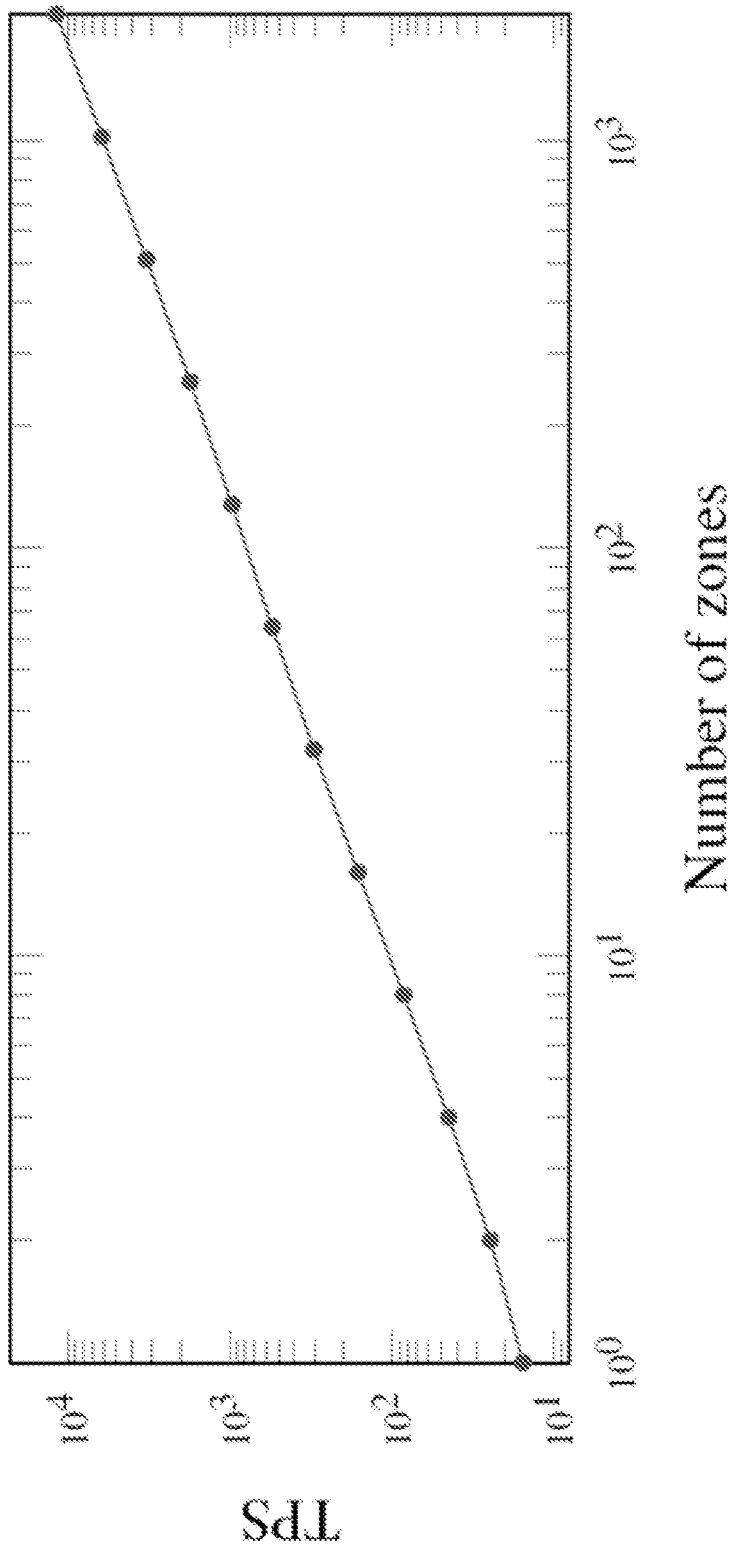
FIG. 5 illustrates, in accordance with at least one embodiment, linear scaling out with multiple zones.
Figure 6:
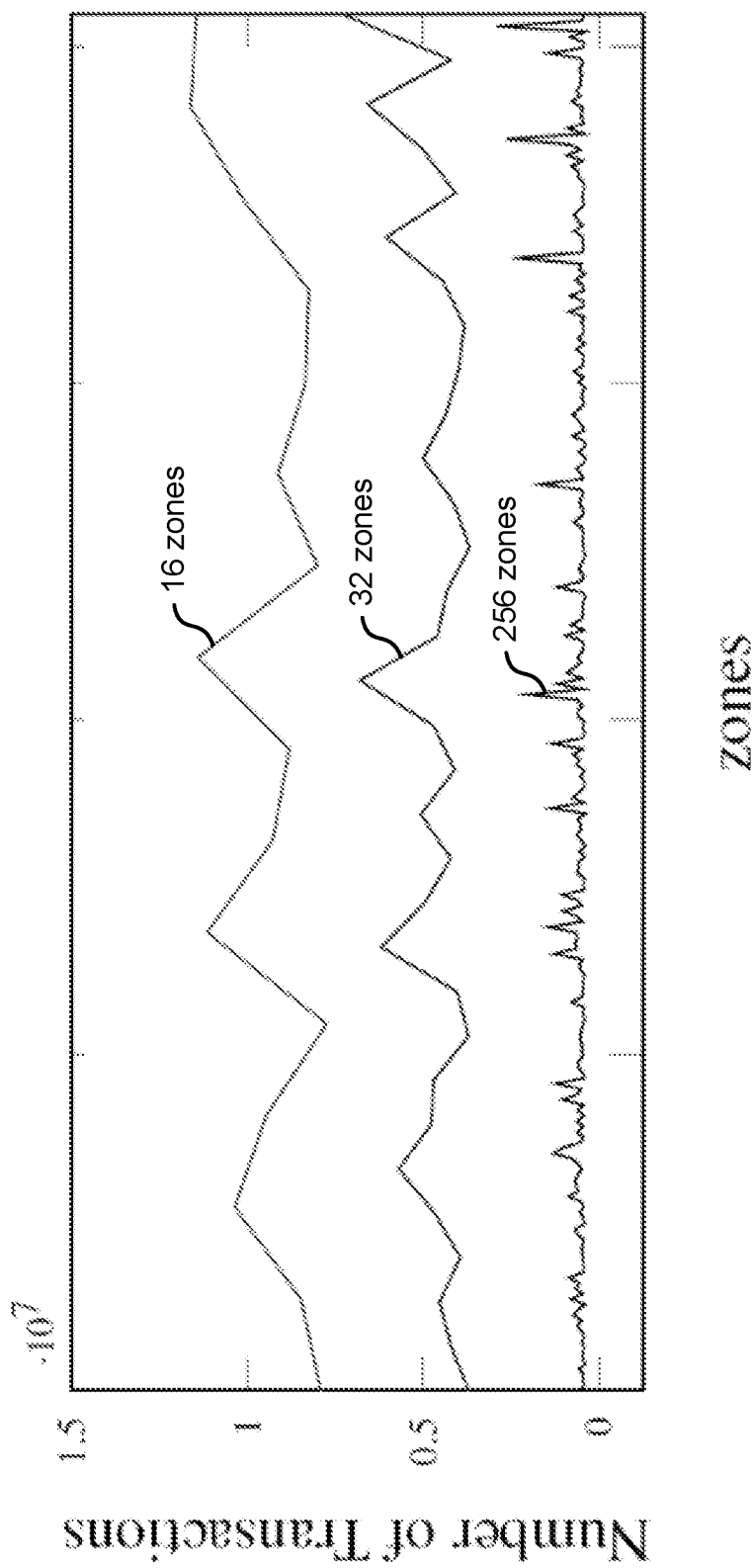
FIG. 6 illustrates, in accordance with at least one embodiment, transaction distribution across zones.

FIG. 5 illustrate linear scaling out with multiple zones, according to at least one embodiment. As part of a benchmark, a system may be evaluated to determine if partitioning mechanism described herein (e.g., as introduced in Section 3.1) can balance the number of payments between zones. The partitioning order k may be changed to generate different numbers of zones, for example, by setting k to 4, 5, 8 and getting 16, 32, 256 zones, respectively. FIG. 6 illustrates transactions handled in each zone are balanced, with different partitioning order k. While, there exist single address hotspots, which can be further optimized as discussed in Section 6.1.

In at least one embodiment, scalability is evaluated by measuring the actual throughput of a system with different number of zones. In at least one embodiment, the number of nodes in each zone is fixed (e.g., 24 nodes with 12 miners in average per zone) when increasing the number of zones. FIG. 5 shows that the measured TPS scales out as the number of zones increasing. The system exhibits the linear scalability, and achieves up to 11,694.89 TPS when there are 2,048 zones. The only exception occurs when increasing the number of zones from one to two which, in at least one embodiment, is due to the overhead of relaying transactions, the performance gain using two zones over one zone is 1.88×.

Overhead

Figure 7:
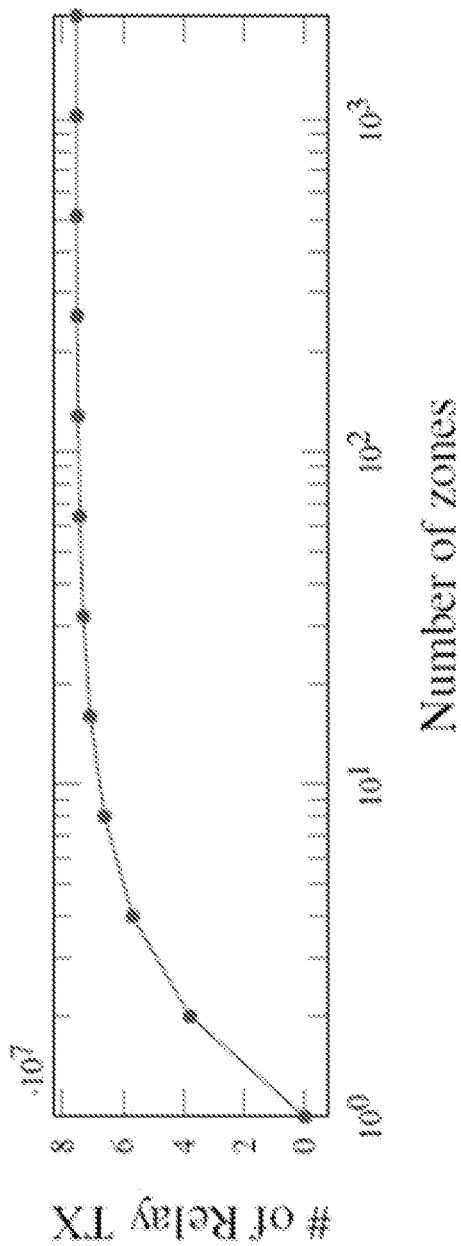
FIG. 7 illustrates, in accordance with at least one embodiment, overhead of derived relay transactions, which approaches to that almost every original transaction will yield a relay transaction.

Although the TPS of a system scales out linearly with the number of zones, relaying transaction across zones actually introduces overhead, amplifying the number of transactions and total sizes of data to be stored and replicated, in at least one embodiment. FIG. 7 shows the number of relay transactions grows when increasing the number of zones. Almost all transactions will lead to a relay transaction when more than 30 zones are used in our experiments. However, such an amplification doubles the total number of transactions at most.

Figure 8:
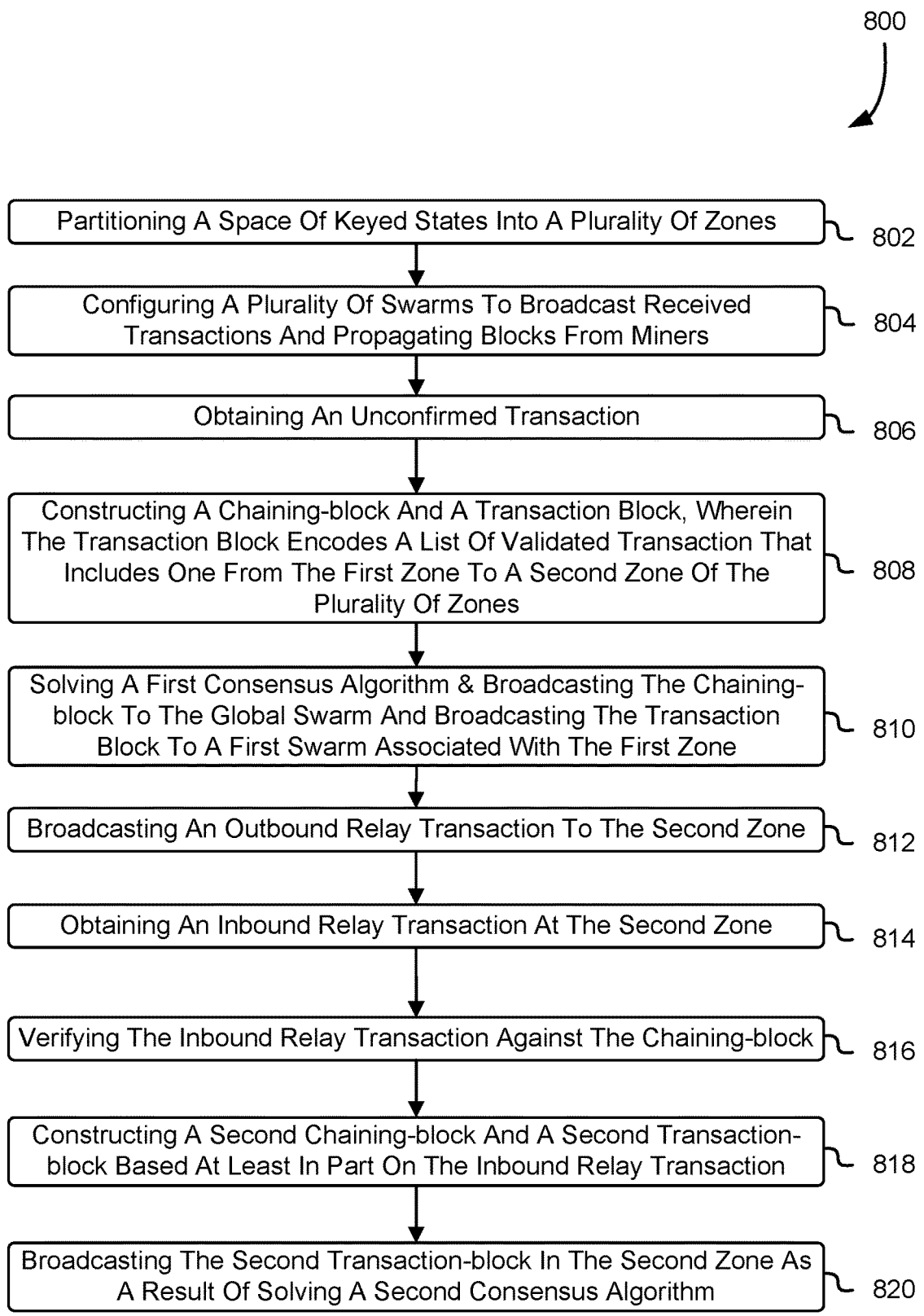
FIG. 8 shows an illustrative example of a process for cross-zone blockchain transactions, in accordance with at least one embodiment.

FIG. 8 shows an illustrative example of a process 800 for cross-zone blockchain transactions, in accordance with at least one embodiment. In at least one embodiment, some or all of the process 800 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

In at least one embodiment, process 800 is implemented by a plurality of computers. In at least one embodiment, process 800 includes partitioning 802 a space of keyed states into a plurality of zones. Each zone may be identified by a partitioning order k and zone index s ($s \in \{0, 1, \ldots, 2^k-1\}$). User addresses may be uniformly partitioned into $2^k$ zones.

In at least one embodiment, process 800 includes causing 804 a plurality of swarms to be configured for broadcasting received transactions and propagating blocks from miners, wherein a swarm of the plurality of swarms is a global swarm for replicating common information to other swarms of the plurality. In some embodiments, full nodes join swarms to broadcast its transactions and receive and propagate blocks from miners. A swarm may refer to a group of one or more nodes that participate in replication of the same data set. In at least one embodiment, a distributed hash table (DHT) is employed for swarm addressing and discovery of peers in a particular swarm.

In at least one embodiment, two or more zones of the plurality of zones can coordinate the execution and processing of a cross-zone transaction. In at least one embodiment, a node (e.g., miner) of a first zone of the plurality of zones includes executable code for obtaining 806 an unconfirmed transaction. The unconfirmed transaction may encode a set of parameters ($\rho$, a, $\phi$, b) that represent a withdraw operation p from payer a and a deposit operation $\phi$ to payee b.

A node or miner from the first zone may validate the unconfirmed transaction and, based at least in part on successfully validating the unconfirmed transaction as being valid, construct 808 chaining-block and a transaction block, wherein the transaction block encodes a list of validated transactions that includes one from the first zone (e.g., original zone) to a second zone of the plurality of zones (e.g., destination zone). The chaining-block and transaction block described here may refer to chaining-block $\Theta^a$ and transaction block $\Phi^a$ described in connection with FIG. 2. The node or miner may solve a first consensus algorithm (e.g., a first proof-of-work specific to the list of validated transactions) and, upon solving the first consensus algorithm, broadcast 810 the chaining-block to the global swarm and broadcasting the transaction block to a first swarm associated with the first zone. For example, the chaining-block $\Theta^a$ is broadcast in the global swarm and the transaction block $\Phi^a$ is broadcast in a's zone-specific swarm, as described in connection with FIG. 2.

In at least some embodiment, in-zone transactions are executed and concluded, and then withdraw operations for cross-zone transaction are executed. For each cross-zone transaction, an outbound relay transaction $\psi:=(\phi, b, y)$ may derived and broadcasted 812 to the destination zone (e.g., a second zone of the plurality of zones). The original zone may be a payer's zone and the destination zone may be a payee's zone.

In at least one embodiment, a node (e.g., miner) at a second zone may obtain 814 an inbound relay transaction $\psi:=(\phi, b, y)$. Miners of a zone may obtain the inbound relay transaction as part of constructing a new block. The node may verify 816 the inbound relay transaction against its original block (e.g., chaining-block $\Theta^a$) and discard it if invalid. However, if the inbound relay transaction is valid, the node of the second zone may construct 818 a second chaining-block $\Theta^b$ and a second transaction-block $\phi^b$ wherein the second chaining-block $\Theta^b$ includes the inbound relay transaction ($\phi$, b, y). The second transaction-block may be broadcasted 820 in the second zone as a result of solving a second consensus algorithm (e.g., a second proof-of-work puzzle). Accordingly, the deposit operation $\phi$ may be executed in the second zone, concluding the transaction ($\rho$, a, $\phi$, b).

Figure 9:
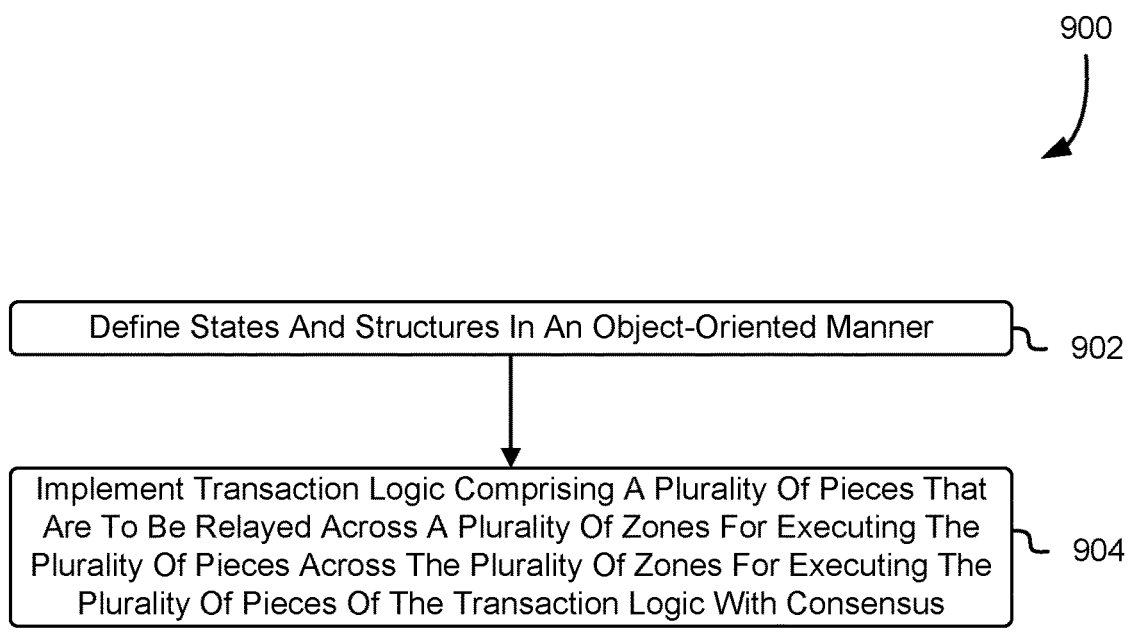
FIG. 9 shows an illustrative example of a process for implementing a programmable transaction logic model, in accordance with at least one embodiment.

FIG. 9 shows an illustrative example of a process 900 for implementing a programmable transaction logic model, in accordance with at least one embodiment. In at least one embodiment, some or all of the process 900 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

In at least one embodiment, a system defines 902 states and structures in an object-oriented manner, for example, a program may define states and data structures in an object-oriented style and define execution logic in a procedural style. In at least one embodiment, a system implements 904 transaction logic comprising a plurality of pieces that are to be relayed across a plurality of zones for executing the plurality of pieces across the plurality of zones for executing the plurality of pieces of the transaction logic with consensus. Each piece of state may be keyed, which associates the data with a specific consensus zone. In some cases, data can relate to a specific user (e.g., balance of a user), in other cases, the data is unrelated to any specific user (e.g., a domain name). An instance of state may be owned by one or more parties, wherein each party is represented by their identities, which may be derived from their public keys. Methods or functions may be associated with structures as most object-oriented languages. Invocation of a method may require secure verification information such as a digital signature). A transaction can include multiple invocation of methods or functions and may involve multiple instances of different states, or structures. In one execution scope in a consensus zone, only instances of states, or structures within the same consensus zone are available, according to at least one embodiment. Manipulation of cross-zone instances of states, or structures may be dependent on a relayed invocation operation which carries context, arguments and execution logic (e.g. a message passing API).

Figure 10:
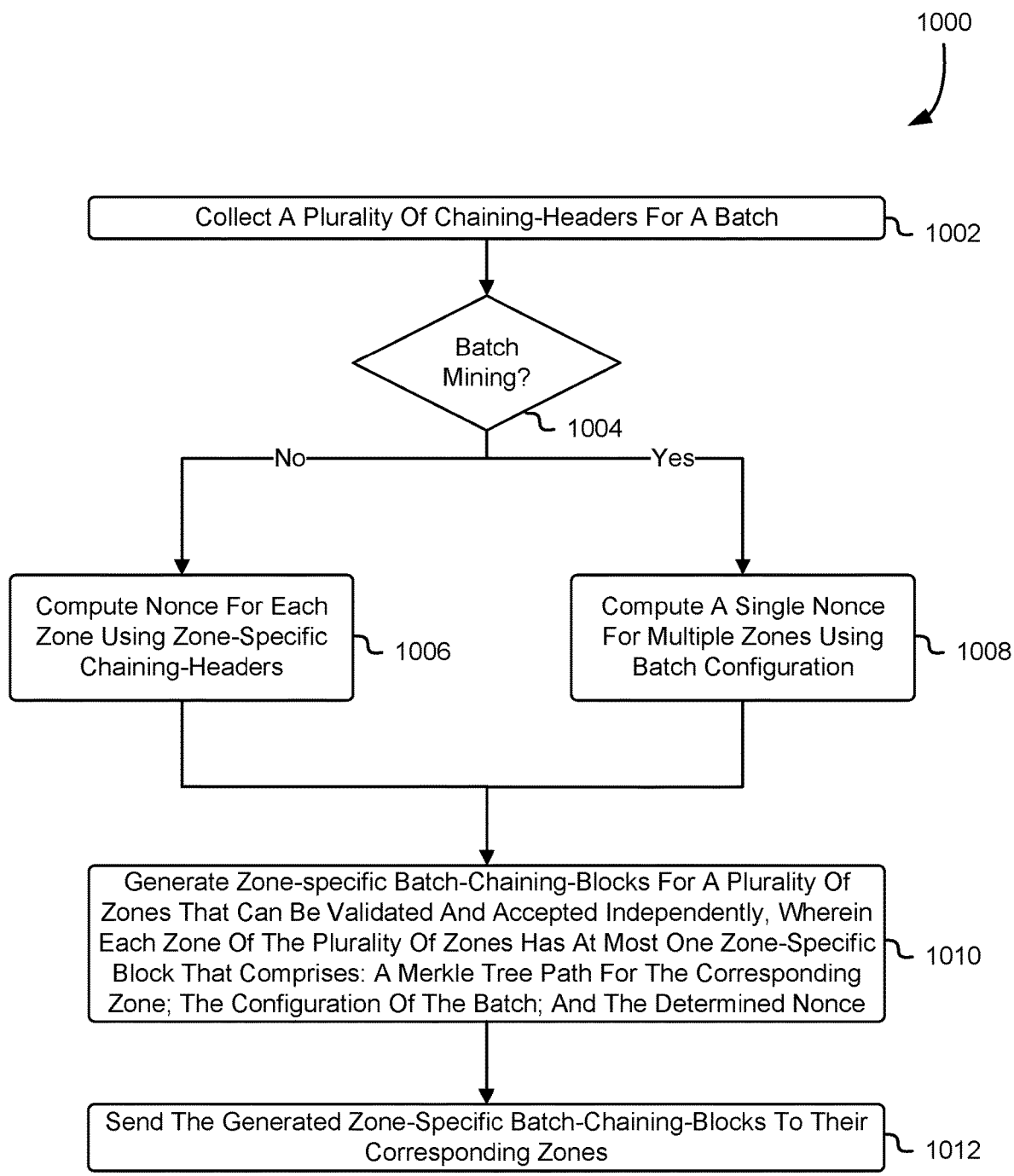
FIG. 10 shows an illustrative example of a process for generating zone-specific batch-chaining-blocks, in accordance with at least one embodiment.

FIG. 10 shows an illustrative example of a process 1000 for generating zone-specific batch-chaining-blocks, in accordance with at least one embodiment. Zone-specific batch-chaining-blocks may be composed and sent to corresponding zones where they are independently validated and accepted by each zone. In at least one embodiment, some or all of the process 1000 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

In at least one embodiment, a computer system implementing process 1000 is a miner of a blockchain network. In at least one embodiment, a miner or other suitable computer system implementing process 1000 includes executable code to collect 1002 a plurality of chaining headers. A computer system may perform transaction validation for a plurality of n zones and collect corresponding n chaining-headers. A chaining-header may comprise one or more of: a version, a partition order k, a zone index s, a hash of the previous chaining-block, a timestamp, a Merkle root (e.g., root of Merkle tree or chain) of a list of confirmed transactions, a Merkle root of a list of deposit transactions originating from the current block, and a difficulty (e.g., mining or PoW target).

In at least one embodiment, the chaining-header $A_i$ for zone i is used to compute a nonce $\eta_i$ for that zone. In at least one embodiment, a computer system includes memory storing computer-readable executable code that, as a result of execution by one or more processors, causes the one or more processors to determine whether 1004 batch mining is used. Various blockchain networks may include support batch mining or lack support for batch mining. For example, blockchain networks such as Bitcoin and Ethereum may lack native support for batch mining. In at least some embodiments, batched mining is supported based on the presence of batch configuration information (e.g., part C of FIG. 3). Nonces may be computed based at least in part on: a one-way function; a root value of a Merkle tree comprising nodes based on the plurality of chaining-headers; a configuration of the batch; and a difficulty target.

In at least one embodiment, if batch mining is not used, a miner may compute 1006 a nonce for each zone using zone-specific chain-headers. In at least one embodiments, a miner computes n nonces $\eta_i$ (i∈[0,n−1]) that each fulfills hash($\langle A_i, \eta_i \rangle$)<$\tau$ in which $\tau$ denotes the mining difficulty (e.g., PoW target), and the <operator takes place by regarding the hash value as a big integer. In at least one embodiment, with batch mining, a miner computes 1008 a single nonce for multiple zones using batch configuration information for the batch. With batch mining, a miner may only need to find a single nonce $\eta_b$ that fulfills hash($\langle h_0, C, \eta_b \rangle$)<$\tau$, in which C is the configuration of the batch and $h_0$ denotes the root of Merkle tree $Y_b$ over the list of all chaining-headers in this batch $\langle A_0, A_1, \ldots, A_{n-1} \rangle$. Batch configuration information may include, for a particular batch: a base shard index b; the size of the batch n; and batch partition order $k_b$. In some embodiments, the PoW targets is or is assumed to be the same in all involved zones.

Once nonce $\eta_b$ is found—for example, using techniques discussed in connection with 1006-1008—a system performing process 1000 may generate 1010 zone-specific batch-chaining-blocks for a plurality of zones that can be validated and accepted independently, wherein each zone of the plurality of zones has at most one zone-specific block that comprises: a Merkle tree path for the corresponding zone; the configuration of the batch; and the determined nonce. A batch-chaining-block may encode: a chaining-header comprising a version, a partition order k, a zone index s, a hash of the previous chaining-block, a timestamp, a Merkle root (e.g., root of Merkle tree or chain) of a list of confirmed transactions, a Merkle root of a list of deposit transactions originating from the current block, and a difficulty (e.g., mining or PoW target); its Merkle tree path $\{h_j\}$ of Merkle tree $Y_b$; batch configuration comprising a base shard index b; the size of the batch n; and batch partition order $k_b$; and the found batch PoW nonce $\eta_b$. In at least one embodiment, the relationships to siblings (left or right) in the Merkle tree path $\{h_j\}$ is not explicitly record—rather, the relationships are inferred from bits of the offset in the batch list (s-b). By this means, the zone index s is coupled with the offset in the block list in the batch, which guarantees that a miner is able to create only one block for each involved zone in one batch. The generated zone-specific batch-chaining-blocks may be sent 1012 to their corresponding zones, for example, by transmission across a network connection.

In at least one embodiment, a Blockchain sharding architecture is configured to run multiple homogeneous chain in parallel to subdivide the workload of the entire network without any centralized coordinator like root chain/main chain/beacon chain. In some cases, a centralized coordinator is not required for operation of the network. Multiple homogeneous chain may operate asynchronously, independently, and/or in parallel in a decentralized manner (e.g., without requiring a centralized coordinator). In some cases, each of the multiple chains have an equal role in that they are equally capable of processing intra-zone blockchain transactions and are equally capable of participating in the processing of cross-zone transactions.

In at least one embodiment, a workload dividing scheme according the blockchain address (e.g., uniquely identifying a blockchain user) that is static, permanent, analytical and deterministic. It divides all workload of transaction validation and execution (CPU), state representation (memory), data broadcast (network) and data archive (disk) so that none will be the new bottleneck. It divides address into multiple zones in a permanent, analytical and deterministic way, such that no additional global directory is required to keep the record. The zone index of an address can be determined based on the address itself alone.

In at least one embodiment, eventual atomicity refers to an efficient algorithm that allow blockchain transaction execution involves data being divided into different zones such that a functional programming model that enforce each function call only modifies the state of a single address (or user), and then invoke more function calls to deal with state update of other blockchain address(es) and/or each substantial function call in different zone are carried and broadcast using relay transactions along with proofs that previous function calls are executed their zones. In various embodiments, a process divides a logic for a blockchain transaction into two or more functions calls, each modifies the state of a single address and cross-zone function calls are carried by relay transactions, with proofs that all precursor function calls are done and confirmed. For example, a cross-zone blockchain transaction to transfer an amount of digital assets may be divided into a first operation to withdraw funds from a first blockchain user in zone A and a second operation may be to deposit funds to a second user in zone B.

In at least one embodiment, Chu-ko-nu Mining refers to a mining protocol to secure a system with multiple chains by allow each mining event produce multiple block for multiple zones. These techniques are not limited solely to proof-of-work consensus algorithm and can be utilized in conjunction with proof-of-stake networks as well as any other network in which a miner can attest to the fulfillment of block creation requirements In at least one embodiment, a protocol securely allows a mining event (or fulfillment of any suitable block creation requirement) produce multiple blocks and not more than one block for each zone.

Figure 11:
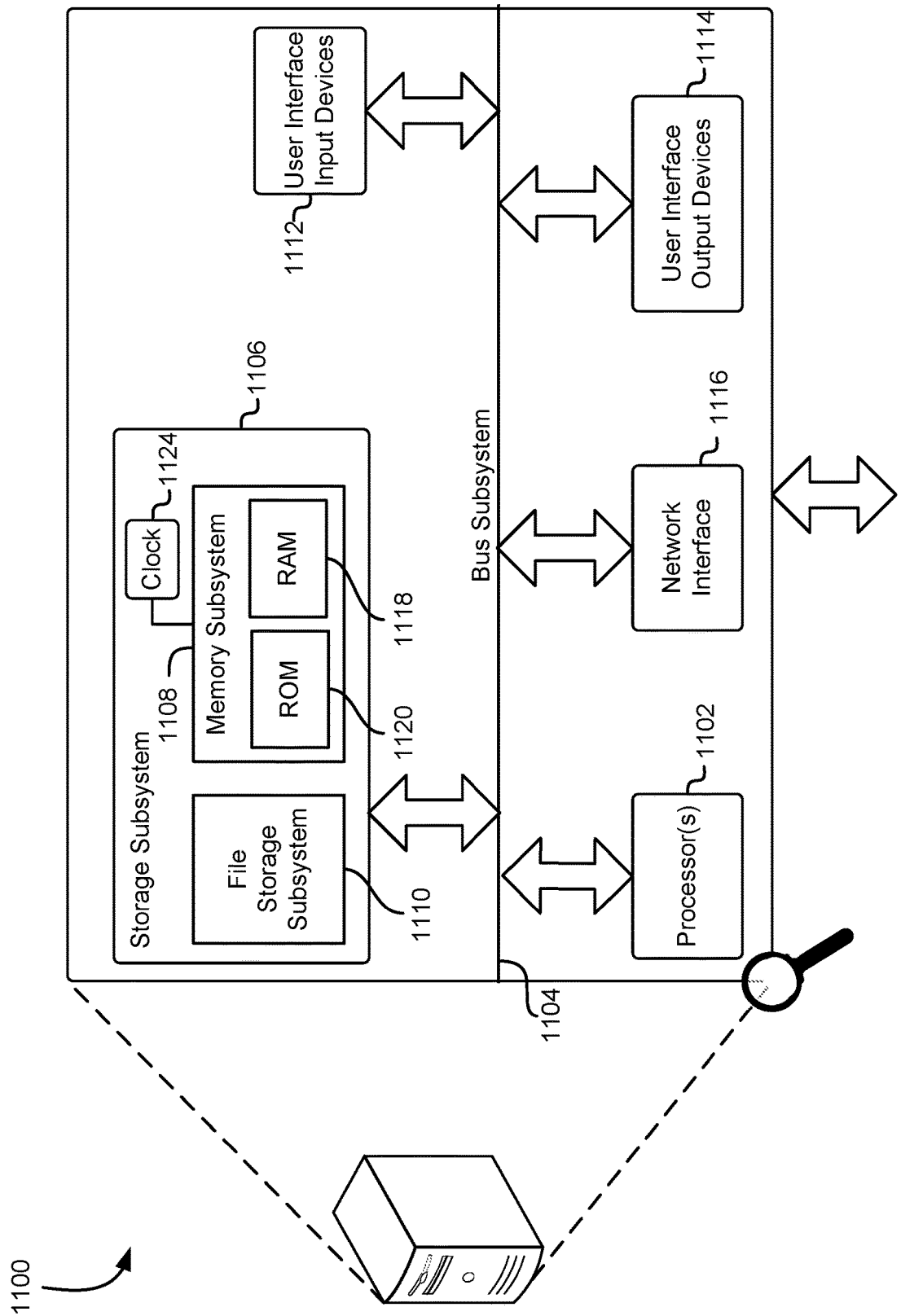
FIG. 11 illustrates an environment in which various embodiments can be implemented.

FIG. 11 is an illustrative, simplified block diagram of a computing device 1100 that can be used to practice at least one embodiment of the present disclosure. Various systems, methods, techniques, etc. described throughout this disclosure, such as those discussed in connection with FIGS. 1-10 may be implemented at least in part using computing device 1100. In various embodiments, the computing device 1100 may be used to implement any of the systems illustrated and described above. For example, the computing device 1100 may be configured for use as a data server, a web server, a portable computing device, a personal computer, or any electronic computing device. As shown in FIG. 11, the computing device 1100 may include one or more processors 1102 that, in embodiments, communicate with and are operatively coupled to a number of peripheral subsystems via a bus subsystem. In some embodiments, these peripheral subsystems include a storage subsystem 1106, comprising a memory subsystem 1108 and a file/disk storage subsystem 1110, one or more user interface input devices 1112, one or more user interface output devices 1114, and a network interface subsystem 1116. Such storage subsystem 1106 may be used for temporary or long-term storage of information.

In some embodiments, the bus subsystem 1104 may provide a mechanism for enabling the various components and subsystems of computing device 1100 to communicate with each other as intended. Although the bus subsystem 1104 is shown schematically as a single bus, alternative embodiments of the bus subsystem utilize multiple buses. The network interface subsystem 1116 may provide an interface to other computing devices and networks. The network interface subsystem 1116 may serve as an interface for receiving data from and transmitting data to other systems from the computing device 1100. In some embodiments, the bus subsystem 1104 is utilized for communicating data such as details, search terms, and so on.

In some embodiments, the user interface input devices 1112 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1100. In some embodiments, the one or more user interface output devices 1114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1100. The one or more user interface output devices 1114 can be used, for example, to present user interfaces to facilitate user interaction with applications performing processes described and variations therein, when such interaction may be appropriate.

In some embodiments, the storage subsystem 1106 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1106. These application modules or instructions can be executed by the one or more processors 1102. In various embodiments, the storage subsystem 1106 additionally provides a repository for storing data used in accordance with the present disclosure. In some embodiments, the storage subsystem 1106 comprises a memory subsystem 1108 and a file/disk storage subsystem 1110.

In embodiments, the memory subsystem 1108 includes a number of memories, such as a main random access memory (RAM) 1118 for storage of instructions and data during program execution and/or a read only memory (ROM) 1120, in which fixed instructions can be stored. In some embodiments, the file/disk storage subsystem 1110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1100 includes at least one local clock 1124. The at least one local clock 1124, in some embodiments, is a counter that represents the number of ticks that have transpired from a particular starting date and, in some embodiments, is located integrally within the computing device 1100. In various embodiments, the at least one local clock 1124 is used to synchronize data transfers in the processors for the computing device 1100 and the subsystems included therein at specific clock pulses and can be used to coordinate synchronous operations between the computing device 1100 and other systems in a data center. In another embodiment, the local clock is a programmable interval timer.

The computing device 1100 could be of any of a variety of types, including a portable computer device, tablet computer, a workstation, or any other device described below. Additionally, the computing device 1100 can include another device that, in some embodiments, can be connected to the computing device 1100 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 1100 for processing. Due to the ever-changing nature of computers and networks, the description of the computing device 1100 depicted in FIG. 11 is intended only as a specific example for purposes of illustrating the preferred embodiment of the device. Many other configurations having more or fewer components than the system depicted in FIG. 11 are possible.

FIG. 11 may one or more computer systems (e.g., one or more of computing device) 1100 that collectively implement a computing resource service provider. A computing resource service provider may provide a variety of services to its customers, and its customers may communicate with the computing resource service provider through an interface, which may be a web page or other type of customer interface. Each service of the services provided by the computing resource service provider may have its own interface and subsets of the services may have corresponding individual interfaces in addition to or as an alternative to a common interface. A customer may communicate with the computing resource service provider through a network, such as the Internet or intranet.

The computing resource service provider may also provide various computing resources and services to its customers, individually or in combination with other resources and services, and the computing resource service provider may further provide those services to the customer through a distributed computing environment. The services provided by the computing resource service provider may include services such as virtual computer system services, block-level data storage services, cryptography services, on-demand data storage services, notification services, authentication services, policy management services, task services and archival data storage services. Not all embodiments described include all the services described, and additional services may be provided in addition to or as an alternative to services explicitly described.

Services provided by a computing resource service provider may include interfaces that enable a customer to submit requests, for example, through appropriately configured API calls, to the various services. In addition, each of the services may include service interfaces that enable the services to communicate with or access each other (e.g., to enable a virtual computer system of the virtual computer system service to store data in or retrieve data from an on-demand data storage service and/or access block-level data storage devices provided by a block-level data storage service). Each of the service interfaces may also provide secured and/or protected access to each other through the use of encryption keys and/or other secured access methods, thereby enabling secure and/or protected access between them. Collections of services operating in concert on a distributed computer system may have a single front-end interface and/or multiple interfaces between the elements of the distributed computer system.

In some embodiments, an input/output module includes any type of communication channel by which two or more devices (e.g., a device such as computing device 1100) may communicate, including physical network cables, wireless communications, universal serial bus (USB), serial, parallel, and other conduits. The network may be any suitable network, including the Internet, an intranet, wide area network (WAN), local area network (LAN), and direct connection. The network may further be configured to facilitate communications of any type of communication protocol, including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

Note that, unless otherwise specified, expressions regarding executable instructions (also referred to as code, applications, agents, etc.) performing operations that instructions do not ordinarily perform unaided (e.g., transmission of data, calculations, and the like) denote that the instructions are being executed by a machine, thereby causing the machine to perform the specified operations.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different x1 and x2 is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

In at least some embodiment, a "blockchain" or "blockchain network" refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin and Ethereum, although other examples of blockchain technologies are also contemplated in the scope of this disclosure. While Bitcoin and Ethereum may be described in connection with various embodiments of this disclosure, those embodiments are to be construed merely as illustrative examples and not limiting. For example, alternative blockchain implementations and protocols are contemplated within the scope of the present disclosure.

A blockchain network may refer to a peer-to-peer electronic ledger implemented as a decentralized system. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output.

In some embodiment, a blockchain transaction is validated before it is committed to the blockchain ledger as part of a block. Blockchain nodes may be used to verify blockchain transactions, which may include verifying digital signatures of transactions, verifying that a purported owner of a digital asset is actually the owner by inspecting the blockchain ledger to verify that control of the digital asset was transferred to the purported owner and that the purported owner has not elsewhere transferred control of the digital asset (meaning that the purported owner was previous the owner of the digital asset but has previously transferred control to another entity).

Validity in the blockchain context may be consensus based, and a transaction may be considered valid if a majority of nodes agrees that the blockchain transaction is valid. In at least some embodiments, a blockchain transaction references an unspent transaction output (UTXO) that is used to validate the transaction by executing the UTXO locking and unlocking script. If the UTXO locking and unlocking script executes successfully (e.g., by evaluating to TRUE and any other validation operations). Accordingly, a blockchain transaction is written to a blockchain ledger when it is validated by a node that receives the transaction and is added to a new block by a node (e.g., miner) and actually mined by being added to the public ledger of past transactions. In at least some embodiment, a blockchain transaction is considered to be confirmed when a certain number of subsequent blocks are added to the blockchain ledger, whereinafter the blockchain transaction becomes virtually irreversible.

A blockchain transaction output may include a locking script that "locks" a digital asset by specifying a condition that is to be met in order for the encumbrance to be lifted or unlocked (e.g., to allow control of the digital asset to be transferred to another user). A locking script may be referred to as an encumbrance. An unlocking script may be a corresponding script that in combination with the locking script, removes an encumbrance on digital assets. A locking script and unlocking script may be combined to form executable code that, if executed to completion or to yield a specific result, indicates that the unlocking script is valid and that the encumberance may be removed. For example, "scriptPubKey" is a locking script in Bitcoin and "scriptSig" is an unlocking script.

It should be noted that while blockchain technology is perhaps most widely known for its use cryptocurrency, there are many other applications for blockchain technologies for providing secure systems. A secure system may refer to a system in which functionality—such as the exchange of digital assets between two or more entities—is cryptographically verifiable. A secure system may be robust to failure. A secure system may be immutable such that information that is committed to the blockchain ledger cannot be unilaterally modified by an individual. A secure system may provide additional assurances, such as assurances of confidentiality, integrity, authenticity, and nonrepudiation. Confidentiality may refer to assurances that certain information is not made publicly available (e.g., the underlying identity of a blockchain address may be kept secret or unknown). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Nonrepudiation may refer to assurances that a party that digitally signs a blockchain transaction cannot deny the authenticity of the transaction.

Mining may refer to the process of validating blockchain transactions along a blockchain network. Validating blockchain transactions may involve a process of securing and verifying blockchain transactions (e.g., organized as blocks) along a blockchain. Mining may be a process that helps maintain network security by ensuring that valid blocks are recorded on a blockchain ledger. Generally speaking, participants in a mining process can be rewarded for using computing resources (e.g., compute resources such as CPUs) to solve computational algorithms. Mining can be done in various ways. Proof-of-work (POW) and proof-of-stake (POS) consensus are two non-limiting examples of how mining can be done.

Proof-of-stake may refer to a consensus algorithm in which validators secure new blocks before they are added to a blockchain network. In a POS mining algorithm, a node may participate in the mining process by staking an amount of digital assets. The POS may be a deterministic concept that states individuals are allowed to mine or validate new blocks equal to proportionally to the amount staked—in other words, the more digital assets a node stakes, the greater mining power the node has. In some cases, greater mining power means that a node has more opportunity to validate blocks and be rewarded. Opportunity may refer to probabilistic opportunity, in which a probability $p_1 > p_2$ does not necessarily guarantee that a first node with higher probability $p_1$ actually mines more than a second node with lower probability $p_2$ over a specific period of time. However, long-run, expected value of miners with larger staked amounts may be greater than those of miners with smaller staked amounts.

A node may become a miner by staking an amount of digital assets from the miner's blockchain wallet by transferring digital assets to a bound wallet. Miners, who may be called validators, delegates, or forgers, may be chosen or voted for randomly by holders of digital assets on the blockchain network. For a node to be chosen as a staker, the node needs to have deposited a certain amount or value of digital assets into a special staking wallet. In at least some embodiments, miners are entitled to forge or create new blocks proportional to the amount staked.

POS blockchain networks may have several important differences from POW blockchain networks. In general, anyone with enough digital assets can validate transactions on a blockchain network, and the benefits of specialized hardware such as application-specific integrated circuits (ASICs) is less pronounced than in POW blockchain networks. Generally speaking, POS blockchain networks may be more energy efficient and environmentally friendly than POW blockchain networks. Non-limiting examples of POS blockchain networks include: DASH; NEO; Lisk; Stratis; PIVX; OkCash; and more. Generally speaking, in a POW blockchain network, nodes with greater computing power are more likely to mine new blocks, whereas in POS blockchain networks, nodes with greater staking amounts are more likely to validators.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on." Further, unless stated otherwise or otherwise clear from context, "some embodiments" may refer to "one or more embodiments."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

CONCLUSION

Accordingly, techniques described herein may be utilized to implement a scalable decentralized consensus system based on Nakamoto consensus mechanism. In at least some embodiments, the system is implemented without weakening decentralization and security, offering a linear scale-out by partitioning the workload of all key components of a Nakamoto consensus system including transaction broadcasting, mining competition, chain storage, transaction execution and state representation. The simplicity of Nakamoto consensus system may be preserved, and its capacity amplified by duplicating equal and asynchronized zones in parallel, which work independently with minimal coordination. Batch mining and eventual atomicity may be implemented to ensure the efficiency and security of a system with thousands of independent zones. In recorded experiments, techniques described herein can be used to implement systems that deliver 1,000×TPS over Bitcoin.

What is claimed is:

1. A non-transitory computer-readable medium storing executable instructions that, as a result of being executed by one or more processors of one or more computer systems, cause the one or more computer systems to:
    create a plurality of consensus zones of a blockchain network, by at least:
        collecting a plurality of chaining-headers for a batch;
        satisfying a block creation requirement;
        generating zone-specific batch-chaining-blocks for a plurality of zones that form a blockchain network, wherein a corresponding zone of the plurality of zones has at most one zone-specific block that comprises:
            a Merkle tree path for the corresponding zone;
            a configuration of the batch; and
            an attestation that the block creation requirement was satisfied; and
        send the generated zone-specific batch-chaining-blocks to their corresponding zones;
        wherein each consensus zone of the plurality is able to unilaterally confirm intra-zone blockchain transactions; and
    process one or more cross-zone blockchain transactions in a decentralized manner by at least, for a cross-zone blockchain transaction of the one or more cross-zone blockchain transactions:
        executing a first function call at a first consensus zone of the plurality of consensus zones that form the blockchain network, wherein the first function call:
            modifies state information of a single blockchain user in the first consensus zone;
            invokes a second function call to modify other state information, of a second blockchain user in a second consensus zone of the plurality of consensus zones; and
        at the second consensus zone:
            verifying a proof that the first function call was executed in the first consensus zone; and
            as a result of successfully verifying the proof, modifying the other state information of the second blockchain user.

2. The non-transitory computer-readable medium of claim 1, wherein the consensus zones are independent and parallel zones that are operable to process the one or more cross-zone blockchain transaction without a centralized coordinator.

3. The non-transitory computer-readable medium of claim 1, wherein each consensus zone is identified by a partitioning order and a zone index derivable from the partitioning order.

4. The non-transitory computer-readable medium of claim 3, wherein the partitioning order is used to uniformly divide a space of blockchain user addresses between the plurality of consensus zones.

5. The non-transitory computer-readable medium of claim 1, wherein the instructions to process the one or more cross-zone blockchain transactions in the decentralized manner include instructions that, as a result of execution by the one or more processors, cause the one or more computer systems to:
    identify a first operation of a cross-chain blockchain transaction to be processed in a first consensus zone of the plurality of consensus zones;
    process the first operation in the first consensus zone;
    identify a second consensus zone of the plurality of consensus zones as a destination for a second operation of the cross-chain blockchain transaction;
    as a result of successfully processing the first operation, broadcast a relay transaction in the second consensus zone, wherein the relay transaction encodes the second operation; and
    as a result of successfully validating the relay transaction in the second consensus zone, process the second operation in the second consensus zone.

6. The non-transitory computer-readable medium of claim 5, wherein the first operation is a withdrawal operation of an amount of digital assets from a first blockchain user in the first consensus zone and the second operation is a deposit operation of the amount to a second blockchain user in the second consensus zone.

7. The non-transitory computer-readable medium of claim 1, wherein confirmation of a first set of blockchain transactions in a first consensus zone of the plurality of consensus zones occurs asynchronously from confirmation of a second set of blockchain transactions in a second consensus zone of the plurality of consensus zones.

8. The non-transitory computer-readable medium of claim 1, wherein the blockchain network is a proof-of-work blockchain network.

9. A computer-implemented method, comprising:
    executing a first function call at a first zone of a plurality of zones that form a blockchain network, wherein the first function call:
        modifies state information of a single blockchain user in the first zone;
        invokes a second function call to modify other state information, of a second blockchain user in a second zone of the plurality of zones; and
    at the second zone:
        verifying a proof that the first function call was executed in the first zone; and
        as a result of successfully verifying the proof, modifying the other state information of the second blockchain user.

10. The method of claim 9, wherein a relay transaction is broadcasted as a result of the first function call modifying the state information, wherein the relay transaction includes the proof that the first function call was executed.

11. The method of claim 10, wherein the relay transaction comprises a nonce that solves a proof-of-work puzzle.

12. The method of claim 9, wherein eventual atomicity is utilized to ensure a blockchain transaction that causes the modification of the state information in the first zone and the modification of the other state information in the second zone is an atomic operation.

13. The method of claim 9, further comprising:
at the second zone, invoking a third function call to modify additional state information, of a third blockchain user in a third zone of the plurality of zones; and
at the third zone:
- verifying a second proof that the first function call was executed in the first zone and the second function call was executed in the second zone; and
- as a result of successfully verifying the second proof, modifying the additional state information of the third blockchain user.

14. The method of claim 9, wherein each zone is identified by a partitioning order and a zone index derivable from the partitioning order.

15. A system comprising one or more processors and memory that stores computer-readable instructions that, as a result of execution by the one or more processors, cause the system to:
- collect a plurality of chaining-headers for a batch;
- satisfy a block creation requirement;
- generate zone-specific batch-chaining-blocks for a plurality of zones that form a blockchain network, wherein a corresponding zone of the plurality of zones has at most one zone-specific block that comprises:
  - a Merkle tree path for the corresponding zone;
  - a configuration of the batch; and
  - an attestation that the block creation requirement was satisfied; and
- send the generated zone-specific batch-chaining-blocks to their corresponding zones.

16. The system of claim 15, wherein the configuration of the batch comprises:
- a base shard index of the batch;
- a size of the batch; and
- a batch partitioning order of the batch.

17. The system of claim 16, wherein relationships of siblings in the Merkle tree path are inferred based at least in part on a zone index and the size of the batch.

18. The system of claim 15, wherein the instructions to satisfy the block creation requirement include instructions that, as a result of execution, cause the system to compute a nonce based at least in part on:
- a one-way function;
- a root value of a Merkle tree comprising nodes based on the plurality of chaining-headers;
- the configuration of the batch; and
- a proof-of-work (PoW) target.

19. The system of claim 15, wherein the zone-specific batch-chaining-blocks are validated and accepted independently in their corresponding zones.

20. The system of claim 15, wherein each zone is identified by a partitioning order and a zone index derivable from the partitioning order.

* * * * *